(12) United States Patent
Yoshino et al.

(10) Patent No.: US 12,052,113 B2
(45) Date of Patent: Jul. 30, 2024

(54) INFORMATION PROCESSING APPARATUS, INFORMATION PROCESSING SYSTEM, METHOD FOR PROVIDING RHYTHM, AND NON-TRANSITORY RECORDING MEDIUM

(71) Applicants: Yuuta Yoshino, Kanagawa (JP); Soh Okumura, Land Rheinland-Pfalz (DE)

(72) Inventors: Yuuta Yoshino, Kanagawa (JP); Soh Okumura, Land Rheinland-Pfalz (DE)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/321,170

(22) Filed: May 22, 2023

(65) Prior Publication Data

US 2023/0388140 A1   Nov. 30, 2023

(30) Foreign Application Priority Data

May 27, 2022 (JP) .................................. 2022-086823
Apr. 6, 2023 (JP) .................................. 2023-062074

(51) Int. Cl.
*H04L 12/18* (2006.01)
*H04N 7/15* (2006.01)

(52) U.S. Cl.
CPC ...... *H04L 12/1822* (2013.01); *H04L 12/1831* (2013.01); *H04N 7/152* (2013.01)

(58) Field of Classification Search
None
See application file for complete search history.

(56) References Cited

U.S. PATENT DOCUMENTS 10,362,272 B1 *  7/2019  Van Os ................... H04N 7/152
11,659,350 B1 *  5/2023  Tran ........................ H04R 3/005
                                                   381/303
(Continued)

FOREIGN PATENT DOCUMENTS

EP       3605421          2/2020
JP    2016167245 A  *     9/2016
(Continued)

OTHER PUBLICATIONS

Satinder P Gill, "Rhythmic synchrony and mediated interaction: towards a framework of rhythm in embodied interaction", AI & SOCIETY ; The Journal of Human-Centred Systems, Springer-Verlag, Lo, vol. 27, No. 1, Nov. 9, 2011 (Nov. 9, 2011), pp. 111-127, XP035007204, ISSN 1435-5655, DOI: 10.1007/S00146-011-0362-2, the whole document.
(Continued)

*Primary Examiner* — Phyllis A Book
(74) *Attorney, Agent, or Firm* — IPUSA, PLLC

(57) ABSTRACT

An information processing apparatus for causing a rhythm providing device to provide a rhythm to be shared among a plurality of participants participating in an online communication includes circuitry. The circuitry obtains first setting information and second setting information respectively set by a first participant and a second participant of the plurality of participants with respect to a level of intensity of the rhythm to be provided to the second participant. The circuitry adjusts the level of intensity of the rhythm to be provided to the second participant based on the first setting information and the second setting information, and generates intensity information related to the adjusted level of intensity of the rhythm.

11 Claims, 13 Drawing Sheets

(56) References Cited

U.S. PATENT DOCUMENTS

| | | | |
|---|---|---|---|
| 2005/0088981 A1* | 4/2005 | Woodruff | H04M 3/568 |
| | | | 370/260 |
| 2017/0221463 A1 | 8/2017 | Lenhert | |
| 2018/0196393 A1 | 7/2018 | Oda et al. | |
| 2019/0394426 A1* | 12/2019 | Segal | H04N 21/42203 |
| 2020/0388190 A1 | 12/2020 | Mochizuki et al. | |
| 2021/0154556 A1 | 5/2021 | Andon | |
| 2022/0286314 A1* | 9/2022 | Meyer | H04N 7/147 |

FOREIGN PATENT DOCUMENTS

| | | | |
|---|---|---|---|
| JP | 2018-136952 | 8/2018 | |
| JP | 2020-113197 | 7/2020 | |
| WO | WO 2018/174088 A1 | 9/2018 | |
| WO | WO-2018174088 A1 * | 9/2018 | G06K 9/00288 |

OTHER PUBLICATIONS

Extended European Search Report for 23174809.6 mailed on Oct. 19, 2023.

* cited by examiner

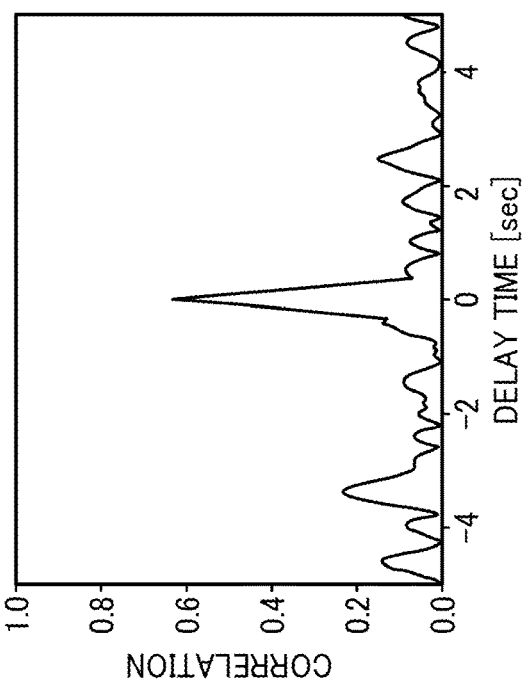
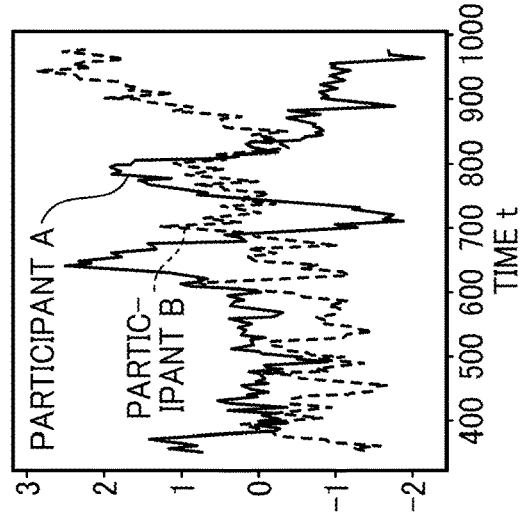
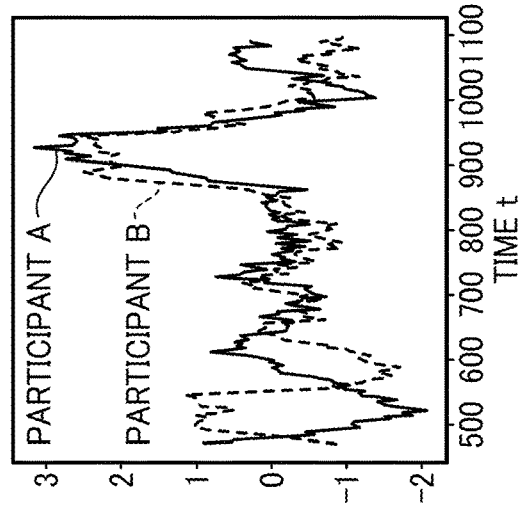

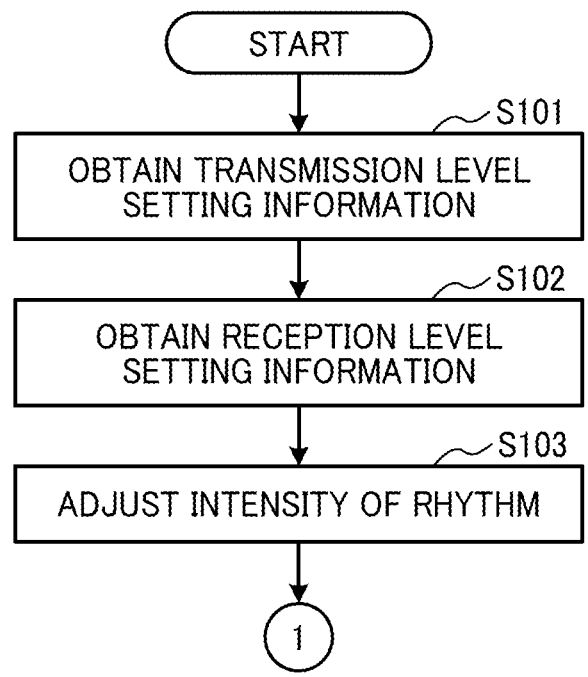

INFORMATION PROCESSING APPARATUS, INFORMATION PROCESSING SYSTEM, METHOD FOR PROVIDING RHYTHM, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2022-086823, filed on May 27, 2022, and 2023-062074, filed on Apr. 6, 2023, in the Japan Patent Office, the entire disclosure of which is hereby incorporated by reference herein.

BACKGROUND

Technical Field

The present disclosure relates to an information processing apparatus, an information processing system, a method for providing rhythm, and a non-transitory recording medium.

Related Art

In an online meeting among a plurality of participants, in order to improve the quality of communication between the participants, there is a technique for facilitating synchronization between the participants by sharing a rhythm between the participants. For example, a technique of causing a robot to perform an action such as a nod or a gesture based on audio data and image data of a plurality of participants to present the action to the participants is known.

SUMMARY

According to an embodiment of the disclosure, an information processing apparatus for causing a rhythm providing device to provide a rhythm to be shared among a plurality of participants participating in an online communication includes circuitry. The circuitry obtains first setting information and second setting information respectively set by a first participant and a second participant of the plurality of participants with respect to a level of intensity of the rhythm to be provided to the second participant. The circuitry adjusts the level of intensity of the rhythm to be provided to the second participant based on the first setting information and the second setting information, and generates intensity information related to the adjusted level of intensity of the rhythm.

According to an embodiment of the disclosure, an information processing system includes the above-described information processing apparatus and a rhythm providing device. The rhythm providing device sets the level of intensity of the rhythm based on the intensity information, and outputs, to the second participant, the rhythm of which the level of intensity is set.

According to an embodiment of the disclosure, a method for providing a rhythm to be shared among a plurality of participants in an online communication, via a rhythm providing device, includes obtaining first setting information and second setting information respectively set by a first participant and a second participant of the plurality of participants with respect to a level of intensity of the rhythm to be provided to the second participant. The method includes adjusting the level of intensity of the rhythm to be provided to the second participant based on the first setting information and the second setting information, and generating intensity information related to the adjusted level of intensity of the rhythm.

According to an embodiment of the disclosure, a non-transitory recording medium storing a plurality of instructions which, when executed by one or more processors, causes the processors to perform the above-described method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 7A to 7D are diagrams each illustrating an example of a case where the information processing apparatus analyzes a degree of synchronization between two participants using time-series data according to the exemplary embodiment of the present disclosure;

FIGS. 10A and 10B (FIG. 10) are a flowchart illustrating an example of a process of providing a rhythm, performed by the information processing system according to the exemplary embodiment of the present disclosure;

Figure 1:
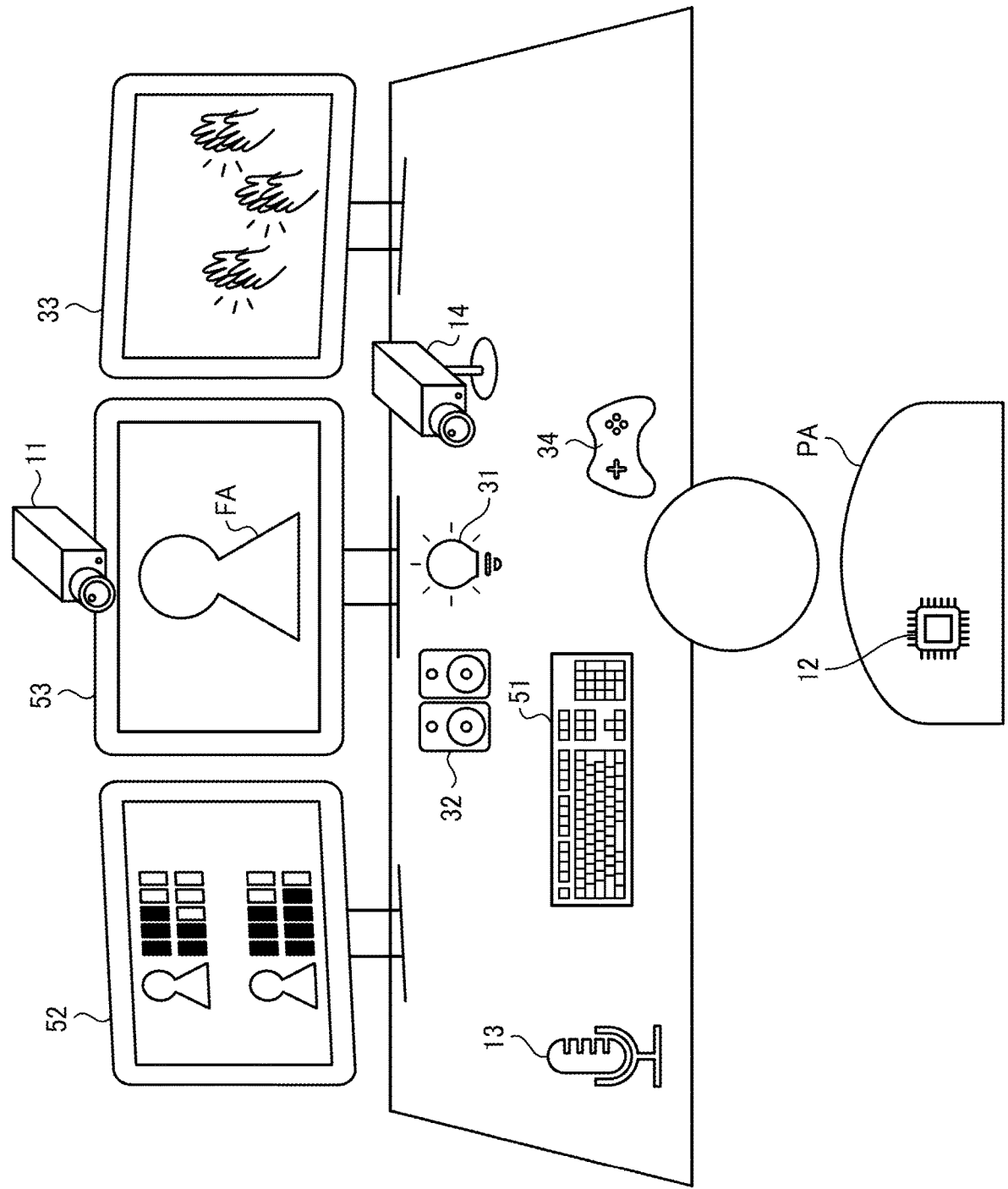
FIG. 1 is a diagram illustrating a state of a plurality of participants participating in an online communication using an information processing system according to an exemplary embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings.

Configuration Example of Information Processing System

In a communication such as an online meeting involving a plurality of participants, a psychological state, such as a degree of empathy, a sense of unity, reliability, or a degree of agreement with respect to between the participants in the communication can be enhanced by providing the plurality of participants with a rhythm that is shared by the plurality of participants. According to one or more embodiments of the present disclosure, an information processing apparatus, an information processing system, a support system, a method, and a program that provides such a rhythm to a plurality of participants are described.

FIG. 1 is a diagram illustrating a state of a plurality of participants FA and PA participating in an online communication using an information processing system according to an embodiment.

As illustrated in FIG. 1, the plurality of participants FA and PA participates in the online communication such as an online meeting. The participant FA as a first participant who is actively participating in the online communication, for example, such as an organizer of the meeting or a speaker who is currently speaking. The participant PA is a second participant who is passively participating in the online communication, for example, such as an attendee of the meeting organized by another person or a person who is currently listening to a speech of another participant.

Accordingly, when the participant PA makes a speech instead of the participant FA, the positions of the participants FA and PA may be switched. In addition, in a case where a discussion is made between the plurality of participants FA and PA, any of the plurality of participants may take any one of the above-described positions of both the participants FA and PA. As described above, in the online communication according to the present embodiment, the active participant FA and the passive participant PA may be flexibly replaced.

In addition, in the example of FIG. 1, the number of the plurality of participants is two, FA and PA, however, a plurality of active participants FA may participate, or a plurality of passive participants PA may participate.

In such a communication including an online meeting, there may be often a plurality of audiences with respect to a speaker. As described above, the information processing system according to the present embodiment may be based on the fact that one active participant FA and the plurality of passive participants PA are present at a certain moment.

Around the participant PA, an image capturing device 11, a vital sensor 12, an audio receiving device 13, a line-of-sight detection device 14, a light source 31, an audio output device 32, a vibration device 34, display devices 33, 52, and 53, and an input device 51 are disposed. The above-described devices are also disposed around the participant FA in substantially the same manner.

The image capturing device 11 is, for example, a camera that captures an image of the participant PA. The vital sensor 12 is attached to the participant PA and can detect heartbeat, respiration, skin potential, body temperature, and other biological information of the participant PA. The audio receiving device 13 is, for example, a microphone that receives audio including voice and speech of the participant PA and converts the audio into an electric signal. The line-of-sight detection device 14 is, for example, a camera that detects the line of sight of the participant PA.

The image capturing device 11, the vital sensor 12, the audio receiving device 13, and the line-of-sight detection device 14 are examples of a detection device 10 (see FIG. 2), which is described later.

In addition, the image of the participant PA captured by the image capturing device 11 may be displayed on the display device 53 of the participant FA via an online system such as a network. The audio including the voice and the speech of the participant PA received by the audio receiving device 13 may be output from the audio output device 32 of the participant FA via an online system such as a network.

The light source 31 is, for example, a light that blinks light at a predetermined rhythm. The audio output device 32 is, for example, a speaker that emits audio at a predetermined rhythm. The display device 33 is, for example, a monitor that displays animation, video effects, and the like that dynamically change at a predetermined rhythm.

The vibration device 34 is a device that vibrates at a predetermined rhythm to transmit vibration to a finger of the participant PA, for example. In the example of FIG. 1, the vibration device 34 includes a controller that allows the participant PA to perform various operations. However, the vibration device 34 may have a form other than the controller, such as an input device such as a keyboard or a mouse, a chair, or a desk, which is operated or touched by the participant PA.

The light source 31, the audio output device 32, the display device 33, and the vibration device 34 are examples of a stimulus providing device 30 (see FIG. 2), which is described later.

In addition, the audio output device 32 may output the audio of the other participant FA. The audio of the other participant FA is received by, for example, the audio receiving device 13 disposed around the other participant FA, and is transmitted to the audio output device 32 of the participant PA via an online system such as a network.

The input device 51 is configured such that the participant PA can input to set, for example, a level of intensity of the rhythm provided to the other participant FA and a level of intensity of the rhythm provided to the participant PA itself, and is, for example, a keyboard, a mouse, a touch panel, or another input device.

The information processing system according to the present embodiment can give a sensory stimulus that can be perceived by a human through, for example, visual sense, auditory sense, or somatic sense to the participant PA at a predetermined rhythm. At this time, the information processing system according to the present embodiment can adjust the level of intensity of the rhythm by changing the frequency, the amplitude, the physical quantity, and the like of the rhythm by the sensory stimulus given to the participant PA. The rhythm, the level of intensity of the rhythm, and the mechanism by which the information processing system according to the present embodiment provides these are described in detail later.

It is assumed that the other participants FA also input these settings via his or her own input device 51. The information related to the settings input from the participants PA and FA is acquired by an information processing apparatus 20 (see FIG. 2), which is described later.

The display device 52 is, for example, a monitor that displays setting information input by the participant PA and setting information input by the participant FA, for example.

The display device 53 is, for example, a monitor that displays an image obtained by capturing an image of the other participant FA. The image of the other participant FA is captured by, for example, the image capturing device 11 disposed around the other participant FA, and is transmitted to the display device 53 of the participant PA via an online system such as a network.

The input device 51 and the display device 52 are examples of an input/output device 50, which is described later. As each of the input device 51 and the display devices 52, 53, and 33, a terminal such as a personal computer (PC) used by the participant PA may be used. In addition, the display devices 33, 52, and 53 may be configured as one monitor. In addition, at least one of the above-described devices including the image capturing device 11, the audio receiving device 13, and the audio output device 32 may be configured integrally with the terminal of the participant PA.

Figure 2:
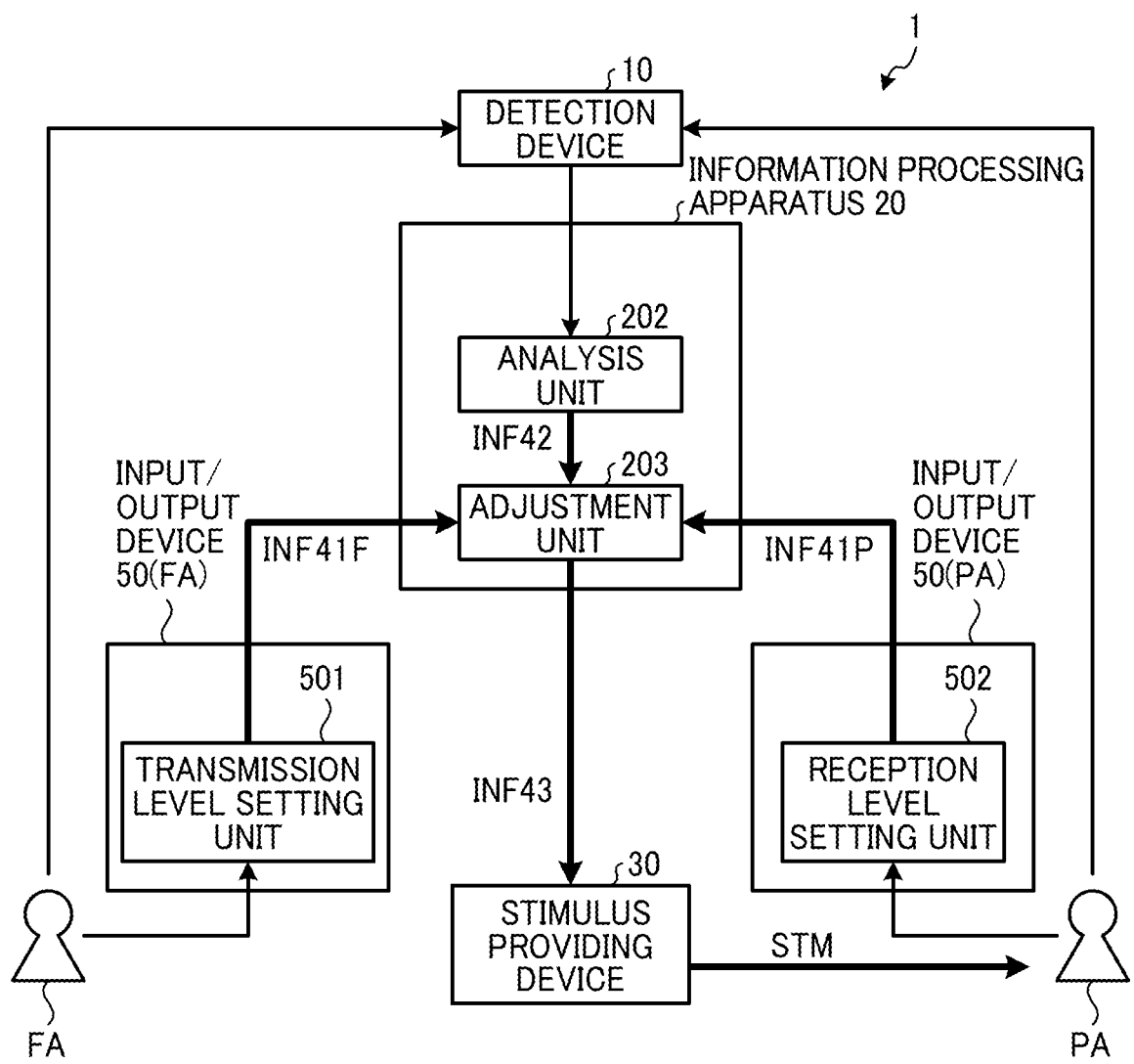
FIG. 2 is a diagram illustrating an example of a schematic configuration of the information processing system according to the exemplary embodiment of the present disclosure.

FIG. 2 is a diagram illustrating an example of a schematic configuration of an information processing system 1 according to the present embodiment.

As illustrated in FIG. 2, the information processing system 1 includes the detection device 10, the information processing apparatus 20, the stimulus providing device 30, and the input/output device 50. FIG. 2 illustrates a part of main configurations of the detection device 10, the information processing apparatus 20, the stimulus providing device 30, and the input/output device 50.

The input/output device 50 is a local PC used by each of the participants FA and PA, for example.

The input/output device 50 (FA) of the participant FA includes, for example, a transmission level setting unit 501, and the participant FA can set a level of intensity of a rhythm that the participant FA desires to provide from the stimulus providing device 30 to the participant PA. The input/output device 50 (FA) generates transmission level setting information INF41F as first setting information according to a setting input by the participant FA. The transmission level setting information INF41F is acquired by the information processing apparatus 20.

The input/output device 50 (PA) of the participant PA includes, for example, a reception level setting unit 502, and the participant PA can set a level of intensity of a rhythm to be provided to the participant PA himself or herself. The input/output device 50 (PA) generates reception level setting information INF41P as second setting information according to a setting input by the participant PA. The reception level setting information INF41P is acquired by the information processing apparatus 20.

As will be described later, each of the input/output devices 50 (FA) and 50 (PA) may include the transmission level setting unit 501 and the reception level setting unit 502.

As described above, the detection device 10 is at least one of the image capturing device 11, the vital sensor 12, the audio receiving device 13, and the line-of-sight detection device 14, for example, and detects image information, biological information, voice information, and other detection information in relation to the participants FA and PA for each of the participants FA and PA.

The information processing apparatus 20 is a computer connected to the detection device 10, the stimulus providing device 30, and the input/output device 50 via an online system such as a network, for example. The information processing apparatus 20 includes, for example, an analysis unit 202 and an adjustment unit 203.

The analysis unit 202 generates state information INF42 indicating a communication state of the participants FA and PA based on the detection information detected by the detection device 10. The communication state of the participants FA and PA includes, for example, a psychological state of the participants FA and PA with respect to the communication, such as a degree of empathy, a sense of unity, and a degree of agreement, and a degree of participation with respect to the communication.

Based on the transmission level setting information INF41F and the reception level setting information INF41P from the input/output device 50 and the state information INF42 from the analysis unit 202, the adjustment unit 203 adjusts a level of intensity of a rhythm to be provided from the stimulus providing device 30 to the participant PA, generates intensity information INF43 corresponding to the adjusted level of intensity of the rhythm, and transmits the intensity information INF43 to the stimulus providing device 30.

The state information INF42 and the intensity information INF43 are described in detail later with reference to FIG. 7 and the drawings subsequent to FIG. 7.

As described above, the stimulus providing device 30 as a rhythm providing device is, for example, at least one of the light source 31, the audio output device 32, the display device 33, and the vibration device 34, and provides a sensory stimulus STM having a rhythm to be shared between the plurality of participants FA and PA to the participant PA.

At this time, the stimulus providing device 30 sets the level of intensity of the rhythm to be provided to the participant PA to the level of intensity adjusted for the participant PA by the adjustment unit 203 based on the intensity information INF43 generated by the adjustment unit 203.

The sensory stimulus STM is, for example, light, sound, video, or vibration that can be perceived by at least one of the five senses of a human. The rhythm of the sensory stimulus STM is a periodic repetition of, for example, strong/weak, bright/dark, or slow/fast, and can be one of stimuli that facilitate synchronization between the plurality of participants FA and PA. In the following description, in some contexts, the term "synchronization" may be related to or indicate, for example, emotional bonding, conformity, a feeling of agreement, or cohesion among participants.

In other words, the sensory stimulus STM having a rhythm to be shared between the plurality of participants FA and PA is provided to each of the participants FA and PA at a level of intensity suitable for each of the participants FA and PA, so that synchronization between the plurality of participants FA and PA is facilitated and the communication between the participants FA and PA becomes smooth.

The detection device 10, the stimulus providing device 30, and the input/output device 50 are prepared as many as the number of participants FA and PA. The analysis unit 202 generates the state information INF42 as many as the number of participants FA and PA.

When there is the plurality of participants PA, the adjustment unit 203 generates the intensity information INF43 for each of the plurality of participants PA. At this time, the adjustment unit 203 generates the intensity information INF42 for each of the plurality of participants PA based on the state information INF41F for the number of participants FA and PA, the transmission level setting information INF41P set for each of the plurality of participants PA by the participant FA, and the reception level setting information INF43 set for each of the plurality of participants PA.

In addition, the stimulus providing device 30 provides the sensory stimulus STM to each of the plurality of participants PA. At this time, the stimulus providing device 30 sets the rhythm of the sensory stimulus STM to the adjusted level of intensity based on the intensity information INF43 corresponding to each of the plurality of participants PA, and provides the sensory stimulus STM corresponding to each of the plurality of participants PA.

As described above, by setting the level of intensity of the rhythm to the level of intensity adjusted for each participant PA and providing the rhythm to each participant PA, a high-quality online communication can be performed while reducing psychological stress of the participant PA. As described above, the information processing system 1 according to the present embodiment functions as, for example, a support system that supports, or assists, an online communication performed among a plurality of participants.

Configuration of Input/Output Device

Figure 3:
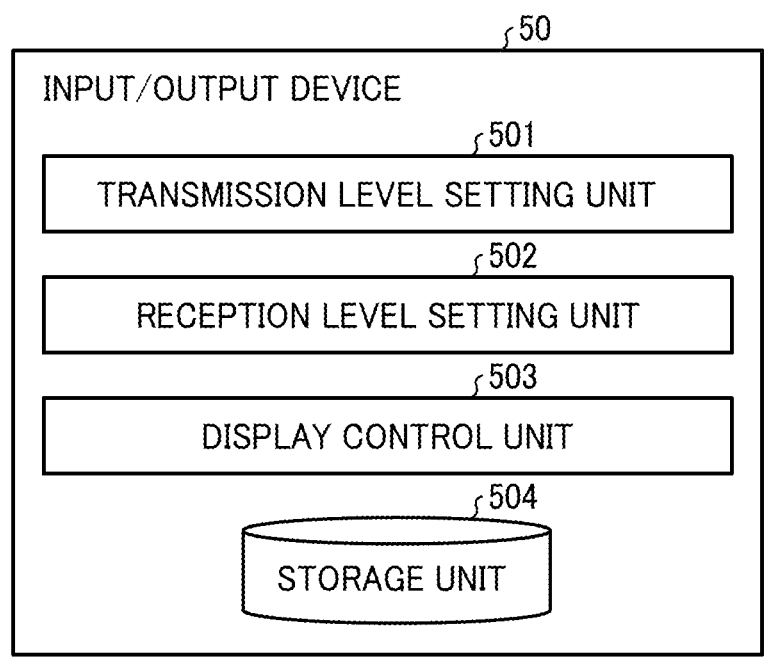
FIG. 3 is a block diagram illustrating an example of a functional configuration of an input/output device according to the exemplary embodiment of the present disclosure.

Referring to FIG. 3, the input/output device 50 according to the present embodiment is described in detail. FIG. 3 is a block diagram illustrating an example of a functional configuration of the input/output device 50 according to the present embodiment.

The input/output device 50 is, for example, a computer that includes a central processing unit (CPU), a read only memory (ROM), and a random access memory (RAM).

Various functions of the input/output device 50 are implemented by the CPU by loading a control program stored in the ROM to the RAM and executing the control program, for example.

As illustrated in FIG. 3, the input/output device 50 includes, for example, the transmission level setting unit 501, the reception level setting unit 502, a display control unit 503, and a storage unit 504 as a functional configuration.

The transmission level setting unit 501 receives an input from a participant who is a user of the input/output device 50, and generates transmission level setting information representing a level of intensity of a rhythm that the participant desires to provide to another participant. The reception level setting unit 502 receives an input from a participant and generates reception level setting information representing a level of intensity of a rhythm that the participant desires to provide to the participant. Each participant can set a transmission level and a reception level as many as the number of participants other than the participant, himself or herself. In other words, when there is a plurality of other participants, the transmission level to each of the other participants and the reception level from each of the other participants can be set.

Each participant may be an active participant FA or a passive participant PA at a different time, as described above. When the participant inputs the transmission level to the input/output device 50 as in described above, the transmission level is determined from a position as the active participant FA. When the participant inputs the reception level, the reception level is determined from a position as the passive participant PA.

The transmission level setting information and the reception level setting information can be set by a participant who inputs. In other words, the participant can determine a setting value of the transmission level setting information based on his or her intention of at what level of intensity to transmit a rhythm to the other participants.

In addition, the participant can determine a setting value of the reception level setting information based on his or her intention of at what level of intensity he or she receives a rhythm from other participants.

Accordingly, the participant can set the transmission level and the reception level at a different level of intensity for each participant based on a relationship with corresponding one of the other participants.

In addition, the participant can input the setting values of the transmission level setting information and the reception level setting information before starting the online communication, for example. In addition, the participant can change the setting values after inputting the setting values once, for example, in the middle of the online communication. As described above, the participant can set the transmission level and the reception level more than one time.

The setting value of each of the transmission level setting information and the reception level setting information may be a numerical value having a lower limit and an upper limit, or may be a language having a quantitative meaning. In a case where the transmission level setting information and the reception level setting information are set using numerical values, for example, the lower limit value is set to "1" and the upper limit value is set to "5," and the setting can be performed using integers from 1 to 5. When the transmission level setting information and the reception level setting information are set by using a language, the setting can be performed in three stages such as "high," "medium," and "low."

It is preferable that the transmission level setting unit 501 and the reception level setting unit 502 include, for example, a mechanical switch, a dial, and an electronic numerical value input function as a physical configuration so that the participant can perform the setting as described above. As an example, such a physical configuration may be implemented by, for example, the input device 51 (see FIG. 1) as described above.

The display control unit 503 of the input/output device 50 controls, for example, various displays on the display devices 52 and 53 (see FIG. 1) described above.

The display control unit 503 causes, for example, the display device 53 to display an image of another participant who is connected online. The image of the other participant is captured by the image capturing device 11 disposed around the other participant and transmitted via online.

In addition, the display control unit 503 causes, for example, the display device 52 to display an input screen of the transmission level setting information and the reception level setting information, and a setting value input by the participant. The participant who is a user of the input/output device 50 can input for the transmission level setting information and the reception level setting information while confirming items to be input on the input screen. In addition, the participant can confirm the setting values of the transmission level setting information and the reception level setting information input by the participant on the display screen for the setting values. The participant may confirm a setting value set by another participant that may be displayed on the display screen of the setting value.

The storage unit 504 of the input/output device 50 stores, for example, various parameters and control programs used for the operation of the input/output device 50.

Configuration of Detection Device

Figure 4:
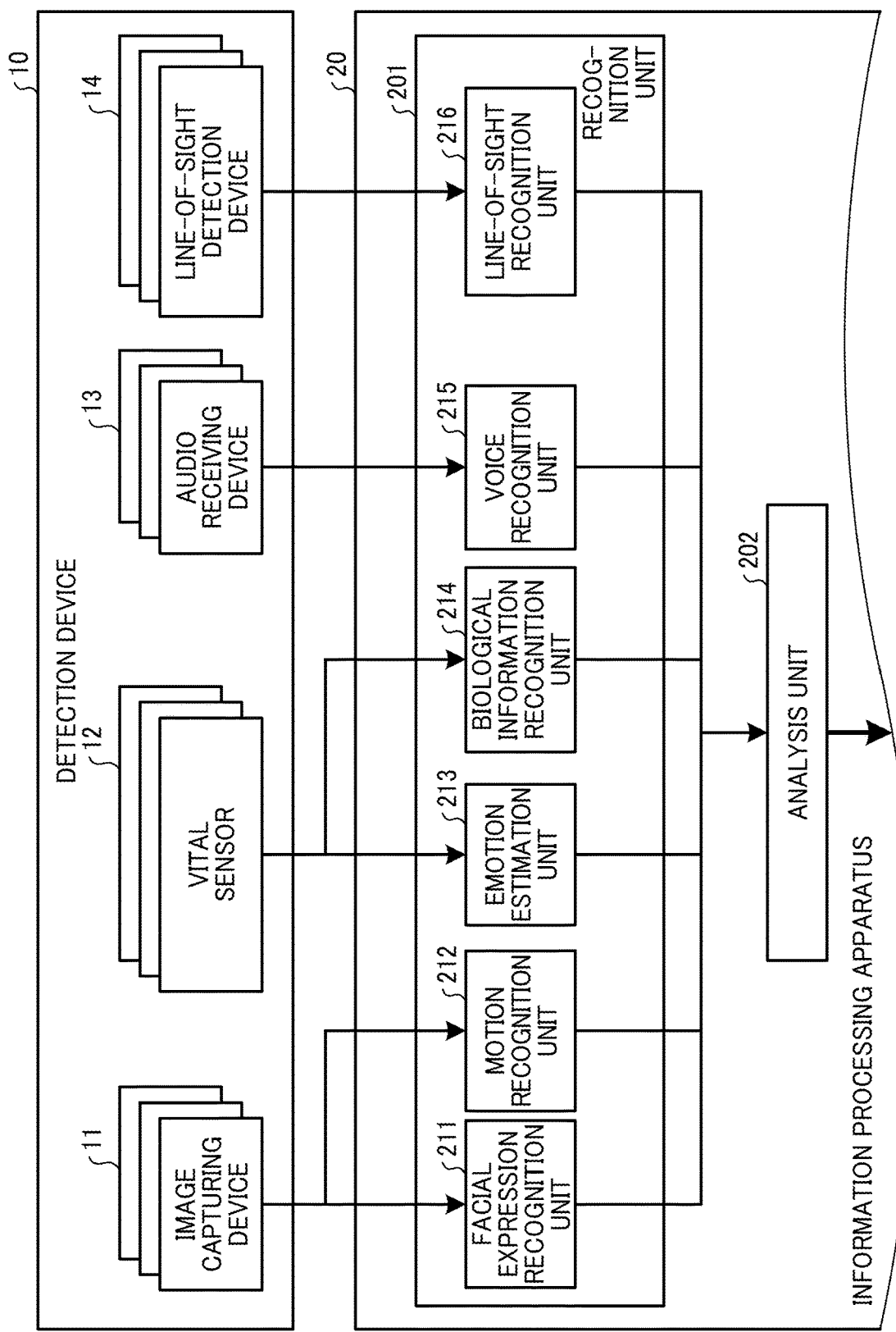
FIG. 4 is a block diagram illustrating an example of a functional configuration of a detection device and a part of an information processing apparatus according to the exemplary embodiment of the present disclosure.

Referring to FIG. 4, the detection device 10 according to the present embodiment is described in detail. FIG. 4 is a block diagram illustrating an example of a functional configuration of the detection device 10 and a part of the information processing apparatus 20 according to the present embodiment.

As illustrated in FIG. 4, the detection device 10 is, for example, at least one of the image capturing device 11, a vital sensor 12, the audio receiving device 13, and the line-of-sight detection device 14. The one or more detection devices 10 are respectively arranged around each participant and detect information related to the corresponding participant.

The detection information detected by the detection device 10 is objective information obtained by detecting various physical quantities related to the participant, such as an image obtained by capturing an image of the participant, a voice of the participant, and biological information of the participant. The detection information obtained by the detection device 10 is output to a recognition unit 201 included in the information processing apparatus 20.

The image capturing device 11 captures an image of the participant in an online communication. The image of the participant is output to the recognition unit 201 of the information processing apparatus 20, and a facial expression recognition unit 211 and a motion recognition unit 212 of the recognition unit 201 recognize a facial expression and a motion of the participant.

The vital sensor 12 is, for example, at least one of a heart rate sensor, a respiration sensor, an electrodermal sensor, a body motion sensor, a temperature sensor, a brain wave sensor, and a cerebral blood flow sensor, and is attached to the participant in a contact or non-contact manner to detect biological information of the participant.

The heart rate sensor detects a heart rate of the participant by, for example, a photoplethysmography method, an electrocardiography method, a blood pressure measurement method, a phonocardiography method, a strain measurement method, a radar ranging method, or an ultrasonic ranging method.

The heartbeat sensor may perform frequency analysis on the detected heart rate of the participant to convert into a low frequency (LF) component, a high frequency (HF) component, or LF/IF that is a ratio between the LF component and the HF component, by, or may obtain, or calculate, a heartbeat cycle based on the detected heart rate of the participant.

The respiration sensor detects a respiration rate of the participant by, for example, a strain detection method, a respiration sound detection method, a humidity detection method, a radar distance measurement method, a pattern irradiation method, a time of flight (ToF) distance measurement method, or a temperature detection method. The respiration sensor may obtain, or calculate, the respiration rate based on the heart rate of the participant.

The electrodermal sensor senses an electrodermal potential of the participant by, for example, electrodermal activity or electrodermal resistance activity.

The body motion sensor detects a body motion of the participant by, for example, a pattern irradiation method, a radar ranging method (Light Detection and Ranging, Laser Imaging Detection and Ranging (LiDAR)), a magnetic method, a mechanical method, or an inertial method.

The body motion sensor may be an acceleration sensor, and may detect a body motion of the participant as acceleration. Alternatively, the body motion sensor may detect a body motion from an image obtained by capturing the image of the participant.

Among the various sensors described above, when the body motion sensor is a sensor that does not use the image capturing device 11, sensing in a dark place or detection of more minute information is possible, for example. In other words, in theory, a body motion sensor using electromagnetic waves, such as a LiDAR or a millimeter-wave radar, has a resolution of about a wavelength to be used, and can detect an expansion of a body due to heartbeat or breathing or a movement of facial muscles due to a change in facial expression. In addition, a body motion sensor using, for example, an acceleration sensor or an inertial sensor is excellent in capturing information such as fine inclination and vibration of an object, and can capture at least a part of expression of a psychological state of the participant such as a posture of a person to be sensed and vibration due to impoverishment and shaking of a hand of a whole body or a local part of the person to be sensed.

The temperature sensor senses a body temperature of the participant, such as by utilizing expansion or pressure, or by sensing thermocouple temperature, electrical resistance, or radiant temperature, or by including an integrated circuit (IC) temperature sensor.

The brain wave sensor is attached to a head, a forehead, or an ear of the participant and detects brain waves of the participant.

The cerebral blood flow sensor detects a cerebral blood flow of the participant by a hemoglobin amount measurement method using near-infrared light, a functional magnetic resonance imaging (fMRI) method, a scintigraphy method, ultrasonic waves, or a temperature difference.

Various types of biological information detected by the vital sensor 12 are output to the recognition unit 201 of the information processing apparatus 20, and an emotion estimation unit 213 and a biological information recognition unit 214 of the recognition unit 201 recognize emotion and biological information of the participant.

The audio receiving device 13 acquires voice of the participant in an online communication. The voice of the participant is output to the recognition unit 201 of the information processing apparatus 20, and the voice recognition unit 215 of the recognition unit 201 recognizes the voice of the participant.

The line-of-sight detection device 14 detects a line of sight of the participant by an image analysis method, a corneal reflection method, a scleral reflection method, a search coil method, or an electrooculogram method. The detection information obtained by detecting the line of sight of the participant is output to the recognition unit 201 of the information processing apparatus 20, and the line-of-sight recognition unit 216 of the recognition unit 201 recognizes the line of sight of the participant.

Configuration of Information Processing Apparatus

Figure 5:
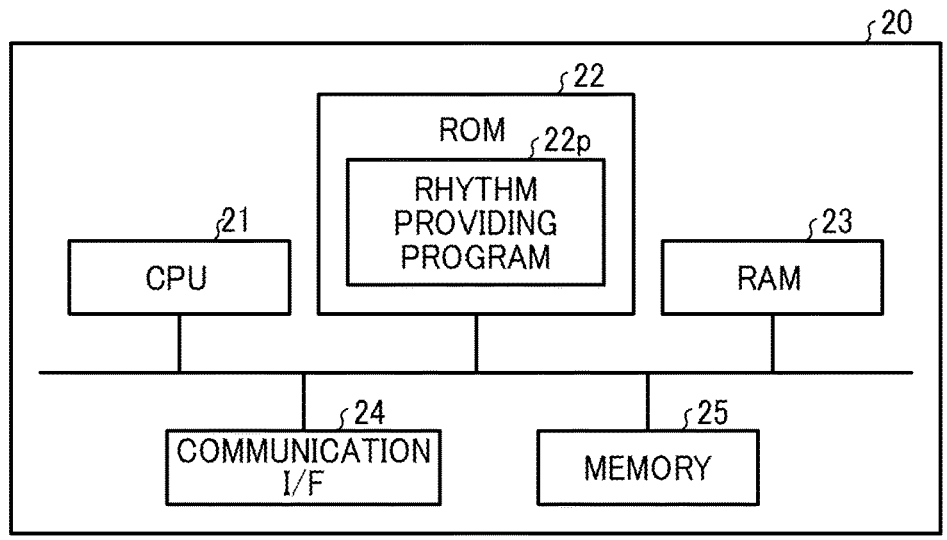
FIG. 5 is a block diagram illustrating an example of a hardware configuration of the information processing apparatus according to the exemplary embodiment of the present disclosure.
Figure 6:
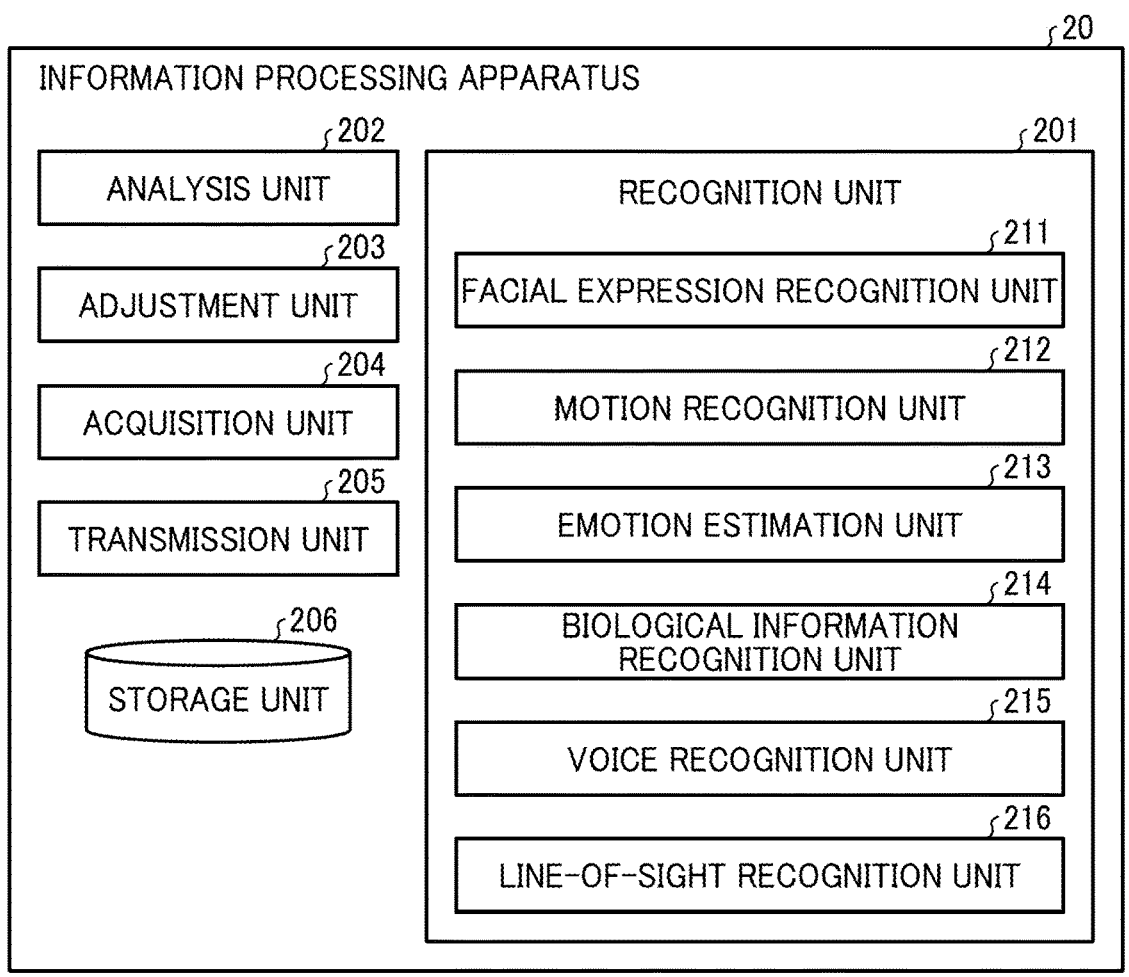
FIG. 6 is a block diagram illustrating an example of a functional configuration of the information processing apparatus according to the exemplary embodiment of the present disclosure.

Referring to FIGS. 5 to 7, the information processing apparatus 20 according to the present embodiment is described in detail. The information processing apparatus 20 is configured as a computer connected to an online system such as a network. The information processing apparatus 20 may be configured as a server such as a cloud server being on a network.

FIG. 5 is a block diagram illustrating an example of a hardware configuration of the information processing apparatus 20 according to the present embodiment. As illustrated in FIG. 5, the information processing apparatus 20 includes a CPU 21, a ROM 22, a RAM 23, a communication interface (I/F) 24, and a memory 25.

The CPU 21 controls the entire information processing apparatus 20. The ROM 22 functions as a storage area in the information processing apparatus 20. The information stored in the ROM 22 is held even when the information processing apparatus 20 is turned off. The RAM 23 functions as a primary storage device and serves as a work area of the CPU 21.

For example, when the CPU 21 loads a rhythm providing program 22p stored in the ROM 22 to the RAM 23 and executes the program, a function as the information processing apparatus 20 that causes the stimulus providing device 30 to provide a rhythm to the plurality of participants is implemented. In other words, the rhythm providing program 22p causes the information processing apparatus 20 configured as a computer to perform various processes described in detail below.

The rhythm providing program 22p can be provided by being recorded on various types of computer-readable recording media such as a flexible disc, a compact disc recordable (CD-R), a digital versatile disc (DVD), BLU-RAY DISC (registered trademarks), and a semi-conductor memory.

Alternatively, the rhythm providing program 22p may be stored in a computer connected to a network such as the Internet and provided by being downloaded via a network. The rhythm providing program 22p may be provided or distributed via a network such as the Internet.

The communication I/F 24 is connectable to a wireless network such as the Internet. Via the communication I/F 24, transmitting and receiving various types of information between the information processing apparatus 20 and each of the detection device 10, the stimulus providing device 30, and the input/output device 50 are performable.

The memory 25 is, for example, a hard disk drive (HDD), a solid state drive (SSD), and functions as an auxiliary storage device of the CPU 21.

FIG. 6 is a block diagram illustrating an example of a functional configuration of the information processing apparatus 20 according to the present embodiment. As illustrated in FIG. 6, the information processing apparatus 20 includes the recognition unit 201, the analysis unit 202, the adjustment unit 203, an acquisition unit 204, a transmission unit 205, and a storage unit 206.

The recognition unit 201 recognizes or measures the detection information obtained for the participant based on the detection information detected by the detection device 10. As described above, the recognition unit 201 includes at least a configuration of one or more of the facial expression recognition unit 211, the motion recognition unit 212, the emotion estimation unit 213, the biological information recognition unit 214, the voice recognition unit 215, and the line-of-sight recognition unit 216 each of which recognizes or measures a physical quantity detected by the detection device 10 corresponding to one of the image capturing device 11, the vital sensor 12, the audio receiving device 13, and the line-of-sight detection device 14, for example.

The facial expression recognition unit 211 and the motion recognition unit 212 extract an expression, a line of sight, a body motion, a posture, a gesture, a motion amount, or distance information of the participant as a feature from an image of the participant captured by the image capturing device 11 using, for example, an image recognition technique.

The emotion estimation unit 213 and the biological information recognition unit 214 extract, for example, a heartbeat interval, a heartbeat waveform, and a respiratory waveform of the participant as features from the biological information of the participant acquired by the vital sensor 12.

The voice recognition unit 215 extracts, for example, a sound pressure, a tempo, a pitch, a word meaning, an intonation, and clarity, of the voice of the participant as features from the voice acquired by the audio receiving device 13 by using, for example, a voice recognition technique.

The line-of-sight recognition unit 216 extracts, for example, a direction and a motion of a line of sight of the participant as features from an image, a corneal reflection, a scleral reflection, or an electrooculogram acquired by the line-of-sight detection device 14.

The recognition unit 201 is implemented by, for example, the CPU 21 executing the rhythm providing program 22p.

The analysis unit 202 analyzes a communication state for each of the plurality of participants based on various kinds of information such as the feature recognized or measured by the recognition unit 201. More specifically, the analysis unit 202 estimates a psychological state of a particular participant, an environmental condition of the surrounding environment of the particular participant, and a psychological state between the particular participant and another participant.

The psychological state of the participant includes, for example, concentration, tension, fatigue, excitement, and pleasure/displeasure. The environmental condition of the surrounding environment of the participant includes a size, a brightness, a sound state, a temperature, a humidity, and a noise level of a space. When there are other participants in the surroundings, environment information may include a physical distance between the participants. The physiological states between the participants includes, for example, attention, vigilance, affinity, credit, trust, sense of unity, sense of expectation, empathy, favor, and disfavor.

In the case of estimating a physiological state between the plurality of participants, when the voice recognition unit 215 recognizes an utterance of the participant FA, the analysis unit 202 analyzes how much the other participant PA is synchronized with the participant FA from a motion or voice of the other participants PA within a certain time of which a start time corresponds to the utterance of the participant FA. Accordingly, the analysis unit 202 can evaluate the physiological state between the participants FA and PA.

As described above, the physiological state among the plurality of participants can be estimated by using, as a starting point, the utterance of the particular participant as a starting point, or alternatively using, as a start point, a timing at which the other participant turns his or her line of sight to the participant, a timing at which the other participant changes his or her body direction with respect to the participant, or a timing at which the other participant performs a gesture with respect to the participant, for example.

As described above, for one participant, the analysis unit 202 may estimate a psychological state of the participant himself or herself, an environmental condition for the participant, and a plurality of psychological states including a psychological state based on a relationship between the participant and another participant. At this time, the analysis unit 202 can estimate such states in relation to the participant based on detection information related to the participant among all the detection information for the plurality of participants detected by the detection device 10.

In other words, the psychological state and the environmental condition in relation to the participant can be estimated based on detection information acquired based on the participant as the detection information related to the participant. The physiological state between the participant and another participant can be estimated, as the detection information related to the participant, based on the detection information related to the participant and additional detection information related the other participant.

In addition, when there is a plurality of other participants, the analysis unit 202 may estimate, for one participant and each of the plurality of other participants, a psychological state based on a relationship with each of the plurality of other participants.

The analysis unit 202 generates state information in which a communication state obtained by estimating a psychological state and an environment condition in relation to each participant and a psychological state between a plurality of participants is converted into an index same as the transmission level and the reception level input from the input/output device 50.

The state information generated by the analysis unit 202 corresponds to, for example, the "state information INF42" illustrated in FIG. 2 described above, and indicates the communication state of the participants FA and PA as described above. More specifically, the analysis unit 202 replaces a physiological state of the participants FA and PA with respect to a communication, such as a degree of empathy, a sense of unity, and a degree of agreement, and a degree of participation in a communication with quantitative numerical values to generate the state information, for example.

As described above, the state information corresponds to, for example, the physiological state or consciousness of the participant. Accordingly, the state information can be represented by a numerical value as an index obtained by quantifying the state information, for example. As an example, in a case where the state information is represented by an integer value from 1 to 5, for example, it can be defined that the state information "5" indicates that the participant highly feels empathy, and the state information "1" indicates that the participant does not feel empathy at all.

At this time, a quantitative value indicated by the state information may correspond to a quantitative value indicated by each of the transmission level setting information and the reception level setting information. In other words, as described above, when the transmission level setting information and the reception level setting information are represented by integer values from 1 to 5, for example, the state information may also be represented by integer values from 1 to 5. In addition, as described above, when the transmission level setting information and the reception level setting information are represented by, for example, three level quantitative languages, the state information may also be represented by the three level quantitative languages.

The state information indicates a level of intensity of a rhythm at which a predetermined communication state is obtained from a general participant. In other words, when the state information is, for example, "3," this means that the communication state of the participant at that time is equivalent to the communication state obtained from the participant when the rhythm having the level of intensity of "3" in each of the transmission level setting information and the reception level setting information is provided.

Such state information can be inductively obtained from data experimentally obtained by providing a rhythm having a predetermined level of intensity to a general subject, for example. Alternatively, the state information can be obtained using machine learning, for example.

The analysis unit 202 is implemented by, for example, the CPU 21 executing the rhythm providing program 22p.

The adjustment unit 203 adjusts a level of intensity of a rhythm to be provided to a particular participant based on the transmission level setting information set for the particular participant by the plurality of participants and the reception level setting information set by the particular participant, and generates intensity information related to the level of intensity of the adjusted rhythm. At this time, the adjustment unit 203 adjusts the level of intensity of the rhythm so that a deviation between the level of intensity of the rhythm indicated by the transmission level setting information and the level of intensity of the rhythm indicated by the reception level setting information is minimized.

For example, it is assumed that the transmission level setting information and the reception level setting information are represented by integer values of 1 to 5, for example, as described above. In this case, if both the transmission level setting information and the reception level setting information are "3," the adjustment unit 203 sets the intensity information to "3." In addition, when the transmission level setting information is "1" and the reception level setting information is "5", the adjustment unit 203 takes, for example, an average value of the values of the transmission level setting information and the reception level setting information and sets the intensity information to "3." When the transmission level setting information is "2" and the reception level setting information is "5," the adjustment unit 203 calculates, for example, an average value of the transmission level setting information and the reception level setting information, and set the intensity information to the integer value of "4" that is closer to the reception level setting information.

In addition, for example, it is assumed that the transmission level setting information and the reception level setting information are represented by the three-level quantitative languages as described above. In this case, if both the transmission level setting information and the reception level setting information are "medium," the adjustment unit 203 sets the intensity information to "medium." In addition, when the transmission level setting information is "high" and the reception level setting information is "low," the adjustment unit 203 adopts, for example, an intermediate amount between the transmission level setting information and the reception level setting information to set the intensity information to "medium." When the transmission level setting information is "high" and the reception level setting information is "medium," the adjustment unit 203 gives priority to the reception level setting information and sets the intensity information to "medium," for example.

In addition, when there is a deviation between the level of intensity of the rhythm indicated by the intensity information adjusted for the particular participant and the state information generated by the analysis unit 202, the adjustment unit 203 further revises the adjusted intensity information.

For example, in a case where the state information is represented by an integer value from 1 to 5 as described above, if both the intensity information and the state information are "3," the adjustment unit 203 does not revise the intensity information and keeps the intensity information at "3".

When the intensity information reflecting an intention of the participant is "3," and the state information representing the actual communication state of the participant is "2," the intensity information is revised so that the state information is made to be close to the intention of the participant. Since a degree of deviation of the state information from the intensity information is "−1," the adjustment unit 203 revises the intensity information "3," which is based on the transmission level setting information and the reception level setting information, by "+1" to obtain "4."

When the intensity information reflecting an intention of the participant is "2," and the state information representing the actual communication state of the participant is "3," the intensity information is revised so that the state information is made to be close to the intention of the participant. Since a degree of deviation of the state information from the intensity information is "+1," the adjustment unit 203 revises the intensity information "2," which is based on the transmission level setting information and the reception level setting information, by "−1" to obtain "1."

When the intensity information is generated based on the transmission level setting information, the reception level setting information, and the state information, the adjustment unit 203 may assign different weights to the transmission level setting information, the reception level setting information, and the state information so that predetermined information is preferentially adopted over the other information.

The adjustment unit 203 is implemented by, for example, the CPU 21 executing the rhythm providing program 22p.

The acquisition unit 204 acquires each of the transmission level setting information and the reception level setting information set by the participant using the input/output device 50. The acquisition unit 204 acquires the detection information from the detection device 10. The acquisition unit 204 is implemented by, for example, the communication I/F 24 operating under the control of the CPU 21 executing the rhythm providing program 22p.

The transmission unit 205 transmits the intensity information generated by the adjustment unit 203 to the stimulus providing device 30.

The transmission unit 205 is implemented by, for example, the communication I/F 24 operating under the control of the CPU 21 executing the rhythm providing program 22p.

The storage unit 206 stores various parameters used for the operation of the information processing apparatus 20 and a control program such as the rhythm providing program 22p. The storage unit 206 is implemented by, for example, the ROM 22, the RAM 23, or the memory 25 that operates under the control of the CPU 21 executing the rhythm providing program 22p.

A method of estimating the physiological state among the plurality of participants by the analysis unit 202 is described in detail.

In the case of estimating the physiological state among the plurality of participants, for example, a method of estimating a degree of synchronization among the plurality of participants can be used. The degree of synchronization between the plurality of participants can be estimated by a fact that a gesture involving a motion, a heartbeat interval, a breathing interval, a tempo, a sound pressure, and a pitch a voice indicates similar changes in a narrow time range between the plurality of participants.

For example, in a case where motion energies of participant are compared by using time-series data, when the time-series data indicates that there is similarity in waveform patterns, that a correlation coefficient indicates a high value within a predetermined time range, or that the peaks or the bottoms appear at the same time, the analysis unit 202 estimates that the degree of synchronization between the participants is high.

Specifically, in a gesture in an actual motion, for example, when a nod, a gesture, a body motion, or a change in a facial expression is seen in the plurality of participants within a short time, or when the above-described gesture is periodically repeated and a phase difference therebetween is less, it can be said that the participants are strongly in synchronization with each other. The analysis unit 202 estimates the degree of synchronization between the participants from, for example, the nod, the gesture, the body motion, or the facial expression change extracted as a feature by the recognition unit 201.

In addition, when values of the tempo, the sound pressure, and the pitch of the voice are arranged in time series, and a correlation is observed between the participants and the waveforms are similar to each other, or synchronization of instantaneous changes occurs, it can be said that the participants are strongly in synchronization with each other. The analysis unit 202 estimates the degree of synchronization between the participants from, for example, the tempo, the sound pressure, or the pitch of the voice extracted as a feature by the recognition unit 201.

In addition, in the case of heartbeat, a period of time of occurrence of the synchronization is said to be relatively long as compared with the above-mentioned motion or voice. Accordingly, when the heartbeat intervals are arranged in time series, when similarity of the waveforms between the participants is high or when the correlation coefficient is high, it can be said that the participants are strongly in synchronization with each other. The analysis unit 202 estimates the degree of synchronization between the participants from, for example, the heartbeat interval or the heartbeat waveform extracted as a feature by the recognition unit 201.

Regarding respiration, it is known that synchronization of instantaneous changes may occur, or the similarity of waveforms of time-series data for a relatively long time increases or the correlation coefficient increases. In these cases, it can be said that the synchronization strongly occurs. The analysis unit 202 estimates the degree of synchronization between the participants from, for example, the respiratory waveform extracted as a feature by the recognition unit 201.

FIGS. 7A to 7D are diagrams each illustrating an example of a case where the information processing apparatus 20 according to the present embodiment analyzes a degree of synchronization between two participants using time-series data.

FIG. 7A is a graph illustrating features indicating a high correlation coefficient between two participants (A and B) in time series. FIG. 7B is a graph illustrating features indicating low correlation coefficients between the two participants (A and B) in time series. In the graphs of FIGS. 7A and 7B, the horizontal axis represents time, and the vertical axis represents the magnitude of the features.

As described above, the feature is a physical quantity indicated by each detection information and is extracted by, for example, the recognition unit 201. From the features, for example, the degree of synchronization among the plurality of participants can be estimated. For example, a face has a feature of change for each part, an expression is formed from the features, and a psychological state such as anger, disgust, fear, pleasure, sadness, surprise, or neutrality can be estimated.

As illustrated in FIG. 7A, predetermined features extracted by the recognition unit 201 based on predetermined detection information indicate a similar change in the two participants (A and B) in a relatively narrow time frame. It can be said that such the features indicate a high correlation coefficient between the participants (A, B).

As illustrated in FIG. 7B, features extracted by the recognition unit 201 based on predetermined detection information different from the above have change timings different from each other in the two participants (A and B). It can be said that such the features indicate a low correlation coefficient between the participants (A, B).

FIG. 7C is a graph illustrating a relationship between the correlation coefficient of the predetermined feature and the delay time between the two participants (A and B). In the graph of FIG. 7C, the horizontal axis represents the delay time of the change in the feature between the participants (A and B), and the vertical axis represents the correlation coefficient.

In the example of FIG. 7C, the correlation coefficient is an index in which the minimum value is 0 and the maximum value is 1, and the correlation coefficient closer to 1 indicates higher correlation. In FIG. 7C, the correlation coefficient has a maximum peak at the delay time 0. This indicates that a change in the feature occurs simultaneously between the two participants (A and B).

In other words, FIG. 7C indicates that the gestures such as nods, or the changes to the same facial expression occur simultaneously in the same phase, which means that the degree of synchronization between the participants (A, B) is high. Such a correlation can tie the physiological states, such as sense of unity, empathy, confidence, etc., of the participants, such as sense of unity, empathy, confidence, etc.

FIG. 7D is a table in which correlation coefficients are associated with psychological states. As an example, in the table of FIG. 7D, the correlation coefficient of a predetermined feature and the physiological state estimated from the feature are classified in stages, and the classifications are associated with each other. In addition, in the table of FIG. 7D, the estimated psychological state is associated with state information which is an index of a level of intensity of a rhythm for obtaining the psychological state.

In the example of FIG. 7D, when the correlation coefficient r is 0≤r<0.2, the physiological state m is estimated to be 0≤m<0.2. In addition, the state information i for obtaining the physiological state m of 0≤m<0.2 from a general participant is defined as 1. When the correlation coefficient r is 0.6≤m<0.8, the physiological state m is estimated to be 0.6≤m<0.8. In addition, the state information I for obtaining a physiological state m of 0.6≤m<0.8 from a general participant is defined to be 4.

However, how to associate the correlation coefficient with the physiological state is not limited to the example of FIG. 7D. In other words, for example, the correlation coefficient and the psychological state may correspond to each other in a proportional relationship, or the power of the correlation coefficient may correspond to the psychological state. In addition, the physiological state may be estimated by a linear expression, a quadratic expression, or a higher-order estimation expression using a plurality of correlations. As an example of estimating one psychological state using a plurality of correlations, for example, there is a case where the psychological state of sense of unity is estimated by combining the synchronization of motion and synchronization of voice.

As described above, the operation of associating the correlation coefficient of a predetermined feature with a psychological state estimated from the feature, and further associating the estimated psychological state with state information in which a level of intensity of a rhythm is converted may be performed by the analysis unit 202 in the information processing apparatus 20, for example. Alternatively, a correspondence table as illustrated in FIG. 7D may be stored in the above-described storage unit 206, and the analysis unit 202 may derive a physiological state corresponding to a calculated correlation coefficient of a predetermined feature and state information corresponding to a physiological state based on the correspondence table.

As described above, the analysis unit 202 visualizes the communication state from the detection information of each participant, calculates a synchronization state as the correlation coefficient, and then calculates the state information by calculation or by the correspondence table stored in the storage unit 206.

Configuration of Stimulus Providing Device

Figure 8:
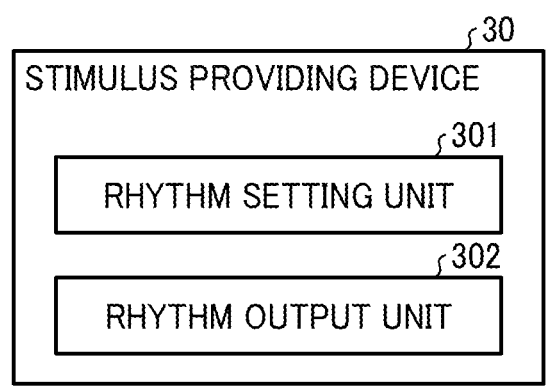
FIG. 8 is a block diagram illustrating an example of a functional configuration of a stimulus providing device according to the exemplary embodiment of the present disclosure.
Figure 13:
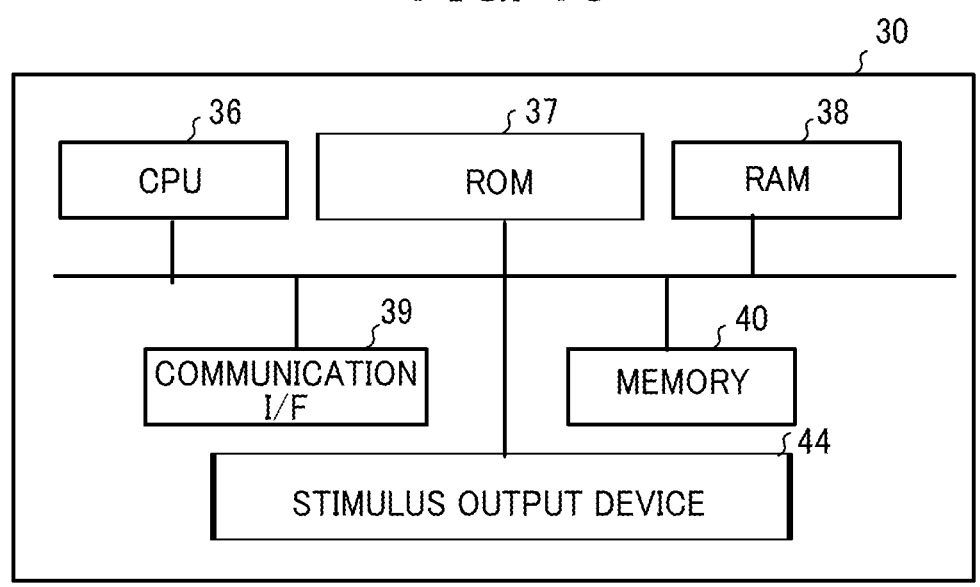
FIG. 13 is a block diagram illustrating an example of a hardware configuration of the stimulus providing device 30 according to the exemplary embodiment of the present disclosure.

Referring to FIG. 8 and FIG. 13, the stimulus providing device 30 according to the present embodiment is described in detail. FIG. 8 is a block diagram illustrating an example of a functional configuration of the stimulus providing device 30 according to the present embodiment. FIG. 13 is a block diagram illustrating an example of a hardware configuration of the stimulus providing device 30 according to the present embodiment.

The stimulus providing device 30 is implemented by a computer and includes, for example, a CPU 36, a ROM 37, a RAM 38, a communication I/F 39, a memory 40, and a stimulus output device 44 as illustrated in FIG. 5. The stimulus providing device 30 according to the present embodiment is, for example, at least one of the light source 31, the audio output device 32, the display device 33, and the vibration device 34 (see FIG. 1) as described above.

The CPU 36 controls the entire stimulus providing device 30. The ROM 37 functions as a storage area in the stimulus providing device 30. The information stored in the ROM 37 is held even when the stimulus providing device 30 is turned off. The RAM 38 functions as a primary storage device and serves as a work area of the CPU 36. The communication I/F 39 is connectable to a wireless network such as the Internet. Via the communication I/F 39, the stimulus providing device 30 performs data communication with another device such as the information processing apparatus 20.

The memory 40 is, for example, a hard disk drive (HDD), a solid state drive (SSD), and functions as an auxiliary storage device.

Various functions of the stimulus providing device 30 are implemented by the CPU 36 by loading a control program stored in the ROM 37 to the RAM 38 and executing the control program, for example.

The stimulus output device 44 outputs stimulus having a rhythm.

As illustrated in FIG. 8, the stimulus providing device 30 includes, for example, a rhythm setting unit 301 and a rhythm output unit 302 as a functional configuration.

The rhythm setting unit 301 sets a rhythm of a sensory stimulus to be provided to a specific participant to a level of intensity based on intensity information corresponding to the participant transmitted from the information processing apparatus 20.

The rhythm output unit 302 provides the sensory stimulus having the rhythm to which the level of intensity is set to the participant PA corresponding to the intensity information, which is received from the information processing apparatus 20. As described above, the sensory stimulus and the rhythm of the sensory stimulus are stimuli such as light, sound, video, and vibration that can be perceived by a human through visual sense, auditory sense, or somatic sense, for example. The level of intensity of such a rhythm can be adjusted by varying at least one of the frequency (wavelength), amplitude (intensity), and physical quantity of the rhythm.

More specifically, in a case where the stimulus providing device 30 is the light source 31, for example, the light emitted by the light source 31 is periodically blinked or the wavelength, that is, the color tone of the light is periodically changed, so that the light, which is the sensory stimulus, has a rhythm. In addition, the level of intensity of the rhythm of light as a sensory stimulus can be varied by varying the wavelength of light to be blinked, the combination of wavelengths of light to be periodically changed, or the intensity of light, that is, the amount of light.

When the level of intensity of the rhythm is changed by changing the wavelength of the blinking light, the level of intensity of the rhythm can be increased by using light having a color with high visibility, and the level of intensity of the rhythm can be reduced by using light having a color with low visibility. When the level of intensity of the rhythm is changed by changing the combination of the wavelengths of light, the level of intensity of the rhythm can be increased by using a combination of colors with high contrast, and the level of intensity of the rhythm can be reduced by using a combination of colors with low contrast. When the level of intensity of the rhythm is changed by changing the amount of light, the intensity of the rhythm can be increased by increasing the amount of light, and the level of intensity of the rhythm can be reduced by lowering the amount of light.

In addition, in a case where the stimulus providing device 30 is the audio output device 32, the sound that is the sensory stimulus has a rhythm by periodically changing the intensity or the scale of the sound emitted by the audio output device 32. In addition, the intensity of the rhythm of the sound as the sensory stimulus can be changed by changing the overall sound volume or the intensity of the sound, or by changing the frequency of the sound, namely, the pitch of the sound.

When the level of intensity of the rhythm is changed by changing the volume, the level of intensity of the rhythm can be increased by increasing the volume, and the level of intensity of the rhythm can be reduced by lowering the volume.

When the level of intensity of the rhythm is changed by changing the intensity of the sound, the level of intensity of the rhythm can be increased by increasing the range of the intensity of the sound, and the level of intensity of the rhythm can be reduced by decreasing the range of the intensity of the sound. In the case where the level of intensity of the rhythm is changed by changing the frequency of the sound, the level of intensity of the rhythm can be increased by using a sound in a range with high perceptual sensitivity, and the level of intensity of the rhythm can be reduced by using a sound in a range with low perceptual sensitivity.

In a case where the stimulus providing device 30 is the display device 33, the display device 33 periodically changes and displays an animation emphasizing the expression or a motion of the other participant, or a video effect, so that the video serving as the sensory stimulus has a rhythm. At this time, the animation or the video effect may be superimposed and displayed on an image obtained by capturing an image of the other participants. Alternatively, an image imitating the other participant, or a facial expression or a motion of the other participant may be projected on a robot, for example.

When an expression of the other participant is emphasized and displayed, for example, a current expression of the other participant may be represented by a character, a symbol, or a video, and the level of intensity of the rhythm of the video, which is the sensory stimulus, can be made different by making the size of the character or the symbol, or the visibility of the video different.

When a motion of the other participant is emphasized and displayed, for example, a current motion of the other participant may be represented by a character, a symbol, or a video, and the level of intensity of the rhythm of the video, which is the sensory stimulus, can be made different by making the size of the character or the symbol, or the visibility of the video different.

In the case where an expression or a motion of the other participant is emphasized by a character, a symbol, or a video, the level of intensity of the rhythm can be increased by displaying the character or symbol in a large size or using the video with high visibility. In addition, by displaying a small character or symbol or using a video with low visibility, the level of intensity of the rhythm can be reduced.

In addition, in a case where the stimulus providing device 30 is the vibration device 34, periodic vibration is generated by the vibration device 34, so that vibration, which is a sensory stimulus, has a rhythm. In addition, by changing the intensity of the vibration, namely, the amplitude, the level of intensity of the rhythm of the vibration, which is the sensory stimulus, can be changed. In other words, the level of intensity of the rhythm can be increased by increasing the amplitude, and the level of intensity of the rhythm can be decreased by decreasing the amplitude.

As described above, the vibration device 34 is built in a keyboard, a controller, a chair, or a desk, for example. The vibration from the vibration device 34 is provided to the participant PA through a finger or a skin, for example.

As described above, a level of intensity of a rhythm of sensory stimulus in relation to a visual sense can be adjusted by, for example, luminance, magnitude, color information, or image contrast, for example. In addition, a level of intensity of a rhythm of sensory stimulus in relation to an auditory sense can be adjusted by, for example, sound pressure such as loudness or volume, or frequency such as pitch. In addition, a level of intensity of a rhythm of sensory stimulus in relation to a somatic sense can be adjusted by, for example, magnitude of amplitude of vibration or difference in a contact area due to a shape of a contact object.

Figure 9:
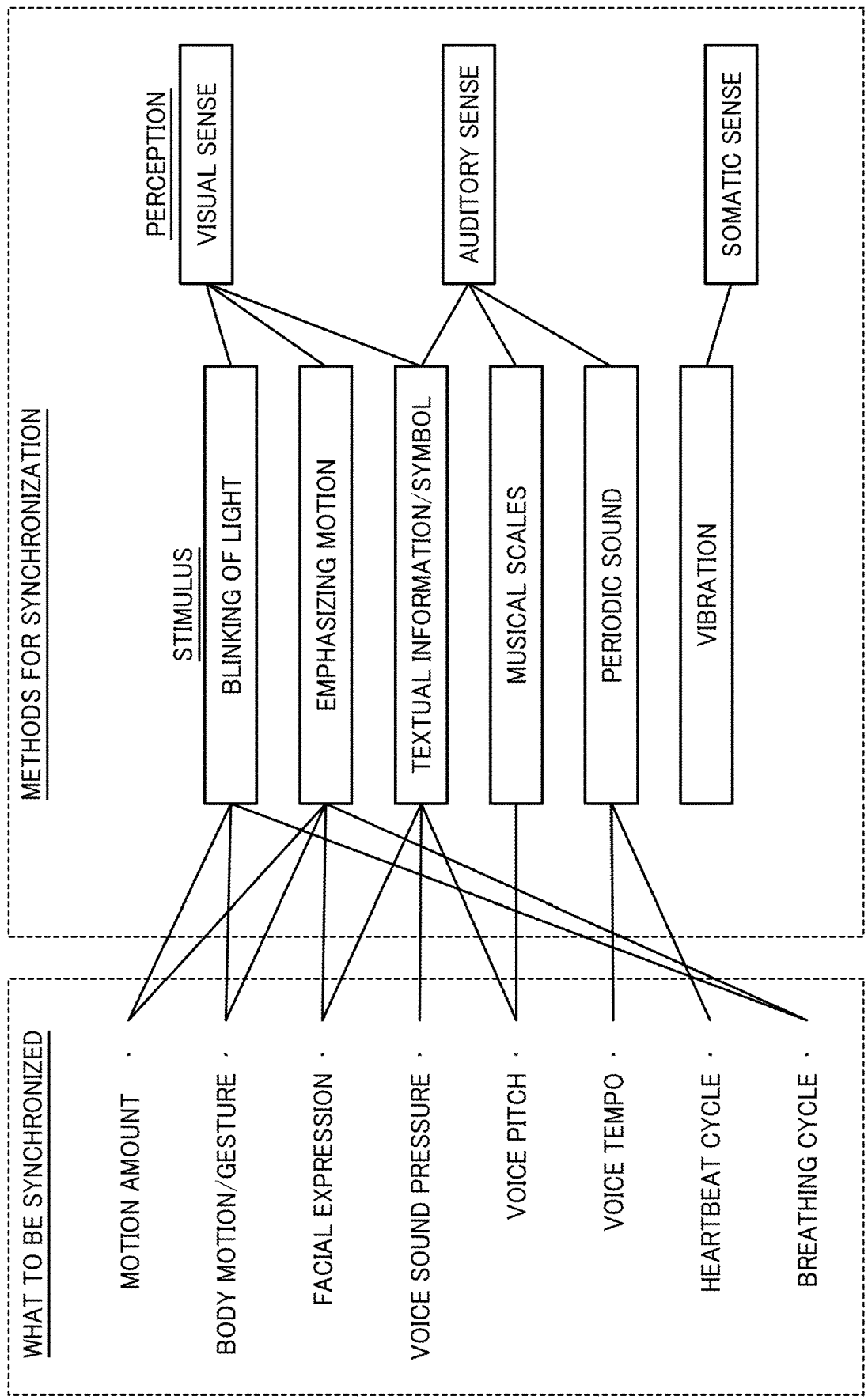
FIG. 9 is a diagram illustrating examples of sensory stimuli provided by the stimulus providing device according to the exemplary embodiment of the present disclosure.

FIG. 9 illustrates a further systematic overview of techniques for facilitating synchronization among the plurality of participants. FIG. 9 is a diagram illustrating examples of sensory stimuli provided by the stimulus providing device 30 according to the present embodiment.

As illustrated in FIG. 9, in a case of facilitating synchronization among the plurality of participants, for example, a motion amount, a body motion/gesture, a facial expression, a voice sound pressure, a voice pitch, a voice tempo, a heartbeat cycle, or a breathing cycle can be one to be synchronized. Stimuli that can be used for the synchronization include, for example, blinking of light, emphasizing a motion by video, display of textual information or symbols, musical scales, periodic sounds, and vibration. The stimuli are mainly perceived by visual sense, auditory sense, or somatic sense among the five senses of human.

The synchronization of motion amount means that the amounts of body motions per unit time or fluctuations of kinetic energy among the plurality of participants are synchronized. As a method of synchronizing the motion amounts, visually, an excited or wakefulness state can be adjusted by blinking of light, or a motion of another participant can be displayed in an emphasized manner, for example. In the case of blinking light, a light source having a single wavelength may be used, or a light may be superimposed on a part of an image obtained by capturing another participant. In the case of emphasizing a motion, a video effect superimposed on a captured figure or a motion of another participant may be used, or a gesture of the participant may be projected on an image or a robot that imitates the participant, for example.

In addition, the synchronization of body motion/gesture means that the body motion/gesture conveying a posture or non-linguistic information is synchronized among the plurality of participants. As a method of synchronizing the body motions/gestures, visually, an excited or wakefulness state can be adjusted by blinking of light, or a body motion/gesture of another participant can be displayed in an emphasized manner, for example. In the case of emphasizing a motion/gesture, a video effect superimposed on a captured figure or a motion/gesture of another participant may be used, or a gesture of the participant may be projected on an image or a robot that imitates the participant, for example.

In addition, the synchronization of facial expression means that facial expressions representing anger, disgust, fear, pleasure, sadness, surprise, or neutrality, which is formed from the above-described features representing a change for each part of a face, are synchronized among the plurality of participants. As a method of synchronizing the facial expressions, a facial expression of a target participant can be displayed in an emphasized manner, or character information/symbol that clearly indicates what a current facial expression is can be presented.

The synchronization of voice sound pressure means that the voice sound pressures each of which indicates loudness of a voice are synchronized among the plurality of participants. As a method of synchronizing the voice sound pressures, for example, the voice sound pressures of the plurality of participants can be displayed in a comparable manner as time-series data, for example. As described above, the stimulus providing device 30 may be provide a stimulus other than a periodic signal, which is a stimulus for facilitating synchronization among the plurality of participants.

In addition, the synchronization of voice pitch means that the voice pitches each of which indicates frequency of a voice and is an index representing the pitch of the voice, is synchronized among the plurality of participants. As a method of synchronizing the voice pitches, for example, the voice pitches of the plurality of participants can be displayed in a comparable manner as time-series data, for example. Alternatively, a chord may be calculated from a difference between the frequencies of the voice pitches of the plurality of participants and may be provided as a sound having a specific scale.

The synchronization of voice tempo is the number of syllables per unit time, and generally means that the voice tempos each of which indicate a speed of a speech is synchronized among the plurality of participants. As a method of synchronizing the voice tempo, for example, an utterance made by a participant is elicited by providing a periodic sound that is synchronized with an utterance of a particular participant, and then providing another periodic sound that is slightly advanced. In addition, by providing a periodic sound that is synchronized with the utterance of a particular participant, and then providing another periodic sound that is slightly delayed, a next utterance made by another participant can be delayed.

The synchronization of heartbeat cycles means that the heartbeat cycles are synchronized among the plurality of participants. For example, a cardiac pacemaker operates as a nonlinear oscillator, and matters that a sympathetic nerve and a parasympathetic nerve are controlled by sound stimulus of a constant cycle from the outside, and a heartbeat interval changes in a certain range are generally known. Accordingly, as a method of synchronizing the heartbeat cycles, for example, a periodic sound that synchronized with a heartbeat cycle of a particular participant can be provided.

The synchronization of breathing cycle means that the breathing cycles are synchronized among the plurality of participants. A matter that the breathing is to be triggered by a blinking light signal is known. A matter that the breathing is synchronized with large movements of others is also known. Accordingly, as a method of synchronizing the breathing cycles, for example, a body motion or a gesture of another participant can be displayed in an emphasized manner.

In addition, a vibration or the like that can be perceived by the somatic sensation can be used in a composite manner such as being provided in synchronization with a cycle in the various methods described above. Alternatively, the vibration may be provided at a point to be emphasized in the synchronization target such as the motion amount, the body motion/gesture, the facial expression, the voice sound pressure, the voice pitch, the voice tempo, the heartbeat cycle, or the breathing cycle.

Process Performed by Information Processing System

Figure 10B:
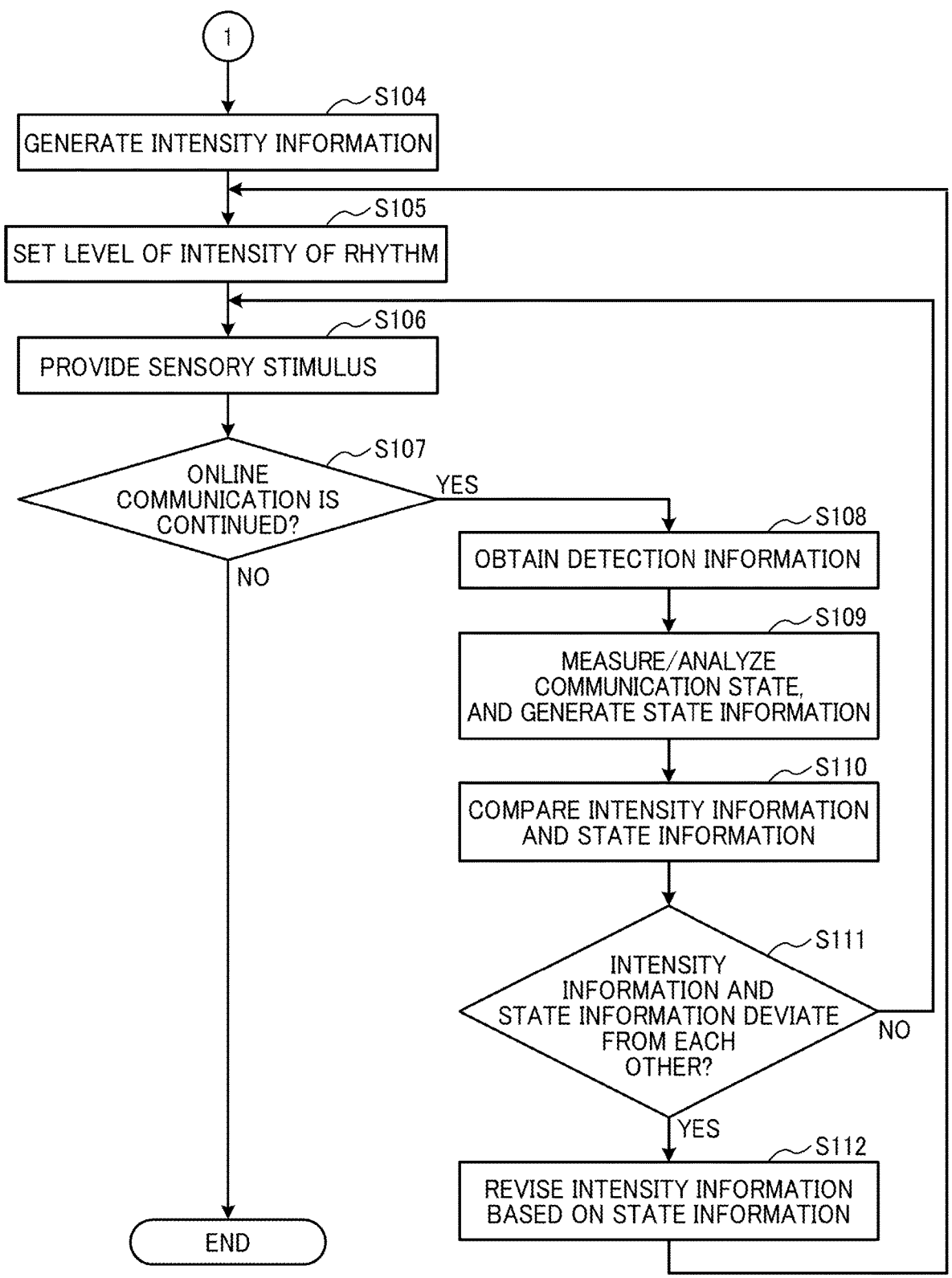

Referring to FIGS. 10A and 10B (FIG. 10), an example of a process, performed by the information processing system 1, for providing a rhythm, according to the present embodiment is described in detail. FIGS. 10A and 10B (FIG. 10) is a flowchart illustrating an example of a process, performed by the information processing system 1, for providing a rhythm, according to the present embodiment.

As illustrated in FIGS. 10A and 10B (FIG. 10), the acquisition unit 204 of the information processing apparatus 20 acquires the transmission level setting information from the input/output device 50 assigned to each participant (step S101).

The acquisition unit 204 acquires the reception level setting information from each of the input/output devices 50 (step S102). However, the processing of steps S101 and S102 may be performed in any order. The processing of steps S101 and S102 may be performed in parallel.

Based on the reception level setting information acquired from a specific participant and the transmission level setting information acquired from another participant, the adjustment unit 203 of the information processing apparatus 20 adjusts a level of intensity of a rhythm to be provided from the stimulus providing device 30 to the specific participant (step S103). In addition, the adjustment unit 203 generates intensity information corresponding to the specific participant based on the adjusted level of intensity of the rhythm (step S104). The processing of steps S103 and S104 is performed for all participants. Accordingly, the intensity information is generated for each participant.

Based on the intensity information generated by the adjustment unit 203 of the information processing apparatus 20, the rhythm setting unit 301 of the stimulus providing device 30 sets the level of intensity of the rhythm to be provided to the participant corresponding to the intensity information (step S105). The rhythm output unit 302 of the stimulus providing device 30 provides the sensory stimulus having the rhythm of which the level of intensity is set for the specific participant to the participant (step S106).

The processing of steps S105 and S106 is performed for all participants. Accordingly, the sensory stimulus having the rhythm of which the level of intensity is adjusted for each participant is provided for each participant, and the predetermined rhythm is shared by these participants.

After this, when the online communication is ended (step S107: No), the process performed by the information processing system 1 ends. When the online communication is continuing (Yes at step S107), the acquisition unit 204 of the information processing apparatus 20 acquires the detection information detected by the detection device 10 for each participant (step S108).

The analysis unit 202 of the information processing apparatus 20 measures the detection information recognized by the recognition unit 201, analyzes the communication state, and generates the state information for each participant (step S109).

The adjustment unit 203 of the information processing apparatus 20 compares the intensity information generated for the specific participant with the state information related to the participant (step S110). In addition, the adjustment unit 203 determines whether or not the intensity information and the state information deviate from each other (step S111).

When the intensity information and the state information deviate from each other (step S111: Yes), the adjustment unit 203 revises the intensity information based on the state information (step S112), causes the stimulus providing device 30 to set the level of intensity of the rhythm to the revised level of intensity (step S105), and causes the stimulus providing device 30 to provide the sensory stimulus having the rhythm of which the level of intensity is revised (step S106).

The processing of steps S108 to S111 is performed for all participants. Accordingly, whether or not there is a deviation between the intensity information and the state information for each participant can be determined. Then, the revising processing of the step S112 is performed on all the participants whose intensity information and state information are deviated from each other, and the sensory stimulus having the revised level of intensity is fed back to the corresponding participant by the processing of the steps S105 and S106.

When the intensity information and the state information do not deviate from each other (step S111: No), the adjustment unit 203 causes the stimulus providing device 30 to provide the sensory stimulus having the rhythm of which the level of intensity remains the same without revising the generated intensity information (step S106).

The information processing system 1 repeats the processing of steps S105 to S112 until the online communication ends (step S107: Yes).

As described above, the process of providing a rhythm performed by the information processing system 1 according to the present embodiment ends.

In an online communication such as a meeting using an online system, a technology visualizing physiological states of a plurality of participants has been widely researched and developed by detecting the language/nonverbal language information of the plurality of participants. In addition, a method of providing feedback to the participants based on detected information has been studied. Accordingly, for example, the physiological states of the participants of the online communication can be grasped without conducting a questionnaire survey on the participants and the quality of communication can be improved.

In the above-described method, in order to improve the quality of communication, when the degree of participation of the participants is low is determined, the evaluation result of the psychological state of the participants such as the degree of empathy, the sense of unity, the degree of agreement, or the rhythm based on the evaluation result is fed back in real time.

For example, in online meetings, various situations are assumed such as a situation in which one-way information sharing is performed by speech of a particular participant, and a situation in which a plurality of participants aim at solving a problem by discussion. It is considered that a situation in which a plurality of participants aims at solving a problem by discussion is a situation in which the organizer and a participant other than the organizer of the meeting want to increase the degree of participation in the participants to facilitate active participation. As described above, there may be a difference in the intention of the participant with respect to the degree of participation for each situation in online meetings.

In addition, generally, it is rare that all of a plurality of participants face each other for the first time, and it is often the case that at least some of the participants have established some kind of relationship before participating in the scene. In this case, there is a possibility that various emotions such as favor, disgust, trust, influence, or the like occur between these participants. In general, there is a tendency that a person desires to actively participate in a communication performed with another one to who the person feels a favor, and desires to passively participate in a communication performed with another one to who the person feels aversion. As described above, there may be a difference in the intention of the participant with respect to the degree of participation depending on the relationship established with the other participant.

Also, regardless of the purpose of communication, some people are active in communicating with others, while others are passive. In this case as well, individual differences may occur among a plurality of participants in the criteria for feeling "actively participating."

As described above, the degree of participation and the psychological state in a communication, there may be individual differences due to differences in personal intention or individual personality, for example. The larger the difference between a degree of participation and a psychological state expected for a participant and the real intention of the participant, the more the psychological resources of the participant are consumed and the participant is burdened. With the methods for intervention according to a related art, a participant can feel psychological stress by forcible feedback to a state designated by a third party other than the participant.

According to the information processing apparatus 20 according to the present embodiment, regarding the level of intensity of the rhythm provided to the passive participant PA, the level of intensity of the rhythm provided to the participant PA by the stimulus providing device 30 is adjusted based on the transmission level setting information set by the active participant FA and the reception level setting information set by the participant PA itself, and the intensity information related to the adjusted level of intensity of the rhythm is generated.

As described above, since each participant can set the level of intensity of the rhythm to be provided to another participant as the transmission level setting. Accordingly, for example, a participant who is an organizer of a meeting can set a transmission level in which the level of intensity of a rhythm is increased for a participant whose agreement is strongly desired by the organizer. Thereby, for example, a desired communication state is easily induced.

In addition, each participant can set the level of intensity of the rhythm to be provided to himself or herself as the reception level setting. This allows the participant to decrease his or her psychological stress by reducing the degree of synchronization with a particular participant with who the participant does not desire to be synchronized. In addition, the participant can decrease his or her psychological stress by lowering the reception level setting in a case where the participant has no or less interest in a topic being discussed at that time, or in a case where there is, among the other participants, a particular participant with who the participant is not comfortable and due to this the participant does not desire to be actively involved.

In addition, the transmission level and the reception level can be set a plurality of times in an online communication. Accordingly, for example, a participant such as an organizer of a meeting can easily set a transmission level for each participant to be low in a situation such as information sharing and induce each participant to concentrate on information rather than other participants. In this case, since each participant does not need to allocate other attention resources and can concentrate on information in which he or she is interested, a favorable situation with low psychological stresses is obtained.

On the other hand, in a situation in which a problem is to be solved by a discussion, the transmission level for each participant is set high, so that the sense of unity, empathy, or reliability can be enhanced to activate the discussion. In this case, each participant can be facilitated to make a statement by feeling a sense of unity with the other participants, or to smoothly talk without collision, and effect that his or her stress can be reduced may be achieved.

As described above, by adjusting the level of intensity of the rhythm in the online communication based on the transmission level setting information and the reception level setting information that can be optionally set by each participant, the intention of each participant can be reflected to the communication and improve the quality of communication while reducing the psychological stress of each participant.

In addition, for example, even when there is a deviation between the degree of participation or the degree of synchronization desired by the active participant FA and the degree of participation or the degree of synchronization desired by the passive participant PA, the deviation can be alleviated to achieve performing the communication smoothly.

As described above, the online communication among a plurality of participants can be supported, or assisted.

According to the information processing apparatus 20 according to the present embodiment, the level of intensity of the rhythm is adjusted by adjusting at least one of the frequency, the amplitude, and the physical quantity of the rhythm. As described above, in the case where the synchronization between the participants is facilitated by providing the rhythm, it is considered that the synchronization can be facilitated more strongly as the amplitude or the physical quantity of the rhythm that can be perceived by a human is larger. In addition, a human has a frequency that can be easily synchronized, and the closer to the frequency, the stronger the synchronization can be urged.

Accordingly, by adjusting the frequency, the amplitude, or the physical quantity of the rhythm, the degree of synchronization can be adjusted to induce a desired communication state.

According to the information processing apparatus 20 according to the present embodiment, the detection information detected by the detection device 10 for the plurality of participants and related to the particular participant PA is analyzed, the state information indicating the communication state of the participant PA is generated, and the level of intensity of the rhythm to be provided to the participant PA is adjusted based on the generated state information.

As described above, by visualizing the psychological state related to the relationship between the plurality of participants FA and PA, such as synchronization, empathy, and sense of unity, of the participant PA to which the rhythm is provided, and quantifying and grasping the motivation of the participant PA to participate in the communication, a rhythm having a level of intensity appropriate for the participant PA can be provided with higher accuracy. In addition, the communication state of the participant PA can be brought close to a target state.

According to the information processing apparatus 20 according to the present embodiment, the detection information detected by the detection device 10 includes at least one of voice information on voice uttered by each of a plurality of participants, image information obtained by imaging each of the plurality of participants, and biological information of each of the plurality of participants. Based on each of the voice information, the image information, and the biological information, the psychological state of each participant can be estimated. Accordingly, by using such information, the physiological state of the participant can be analyzed with high accuracy.

The information processing system 1 according to an embodiment includes the information processing apparatus 20, the stimulus providing device 30 that provides the participant PA with a rhythm set to a level of intensity based on the intensity information, and the detection device 10 that detects the detection information for the plurality of participants. As described above, by incorporating these configurations into a system, information can be transmitted or received with high accuracy and low delay, and the size of the overall system can be reduced.

Variation

Figure 11:
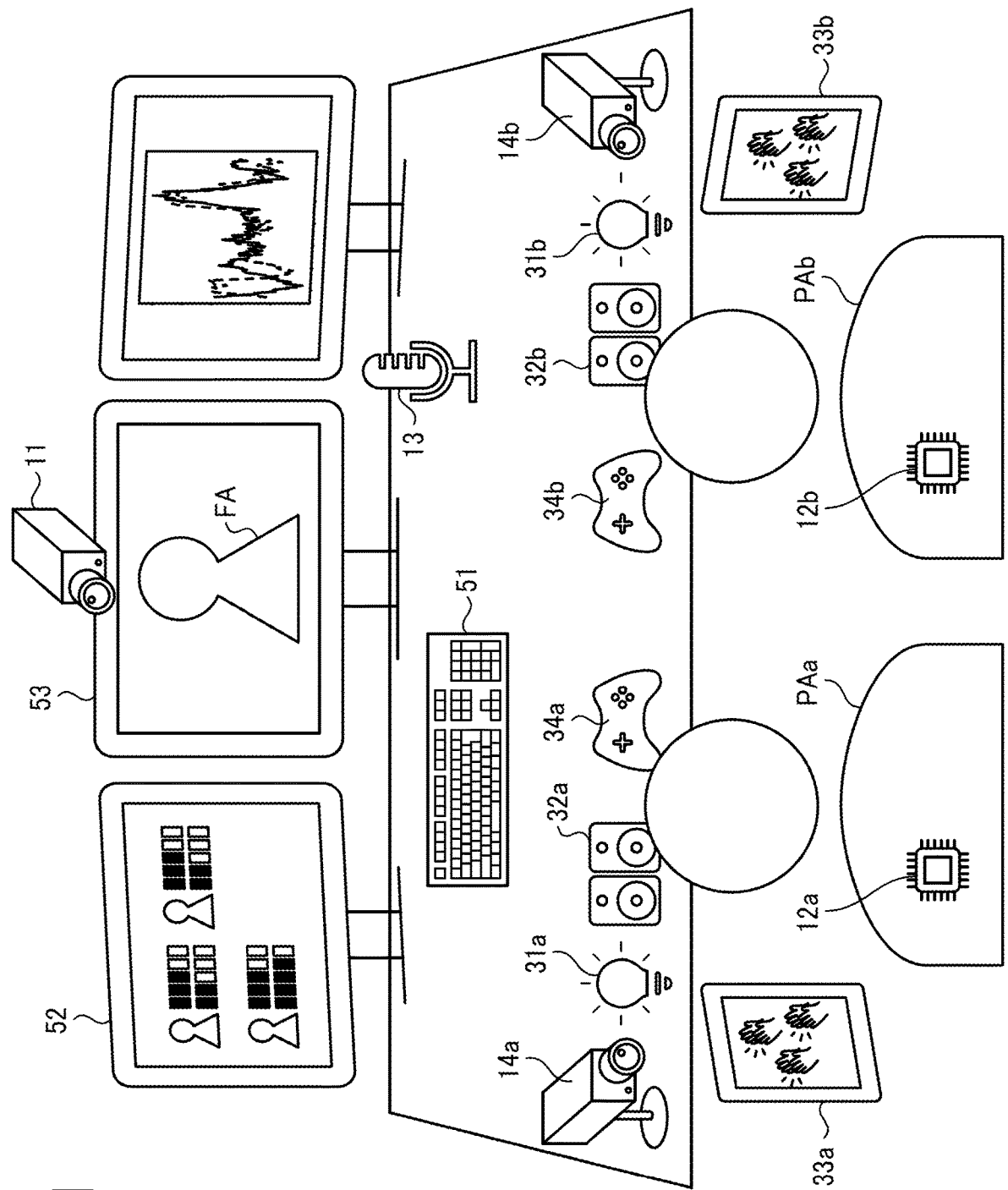
FIG. 11 is a diagram illustrating a plurality of participants participating in an online communication using an information processing system according to one of variations of the exemplary embodiment of the present disclosure.
Figure 12:
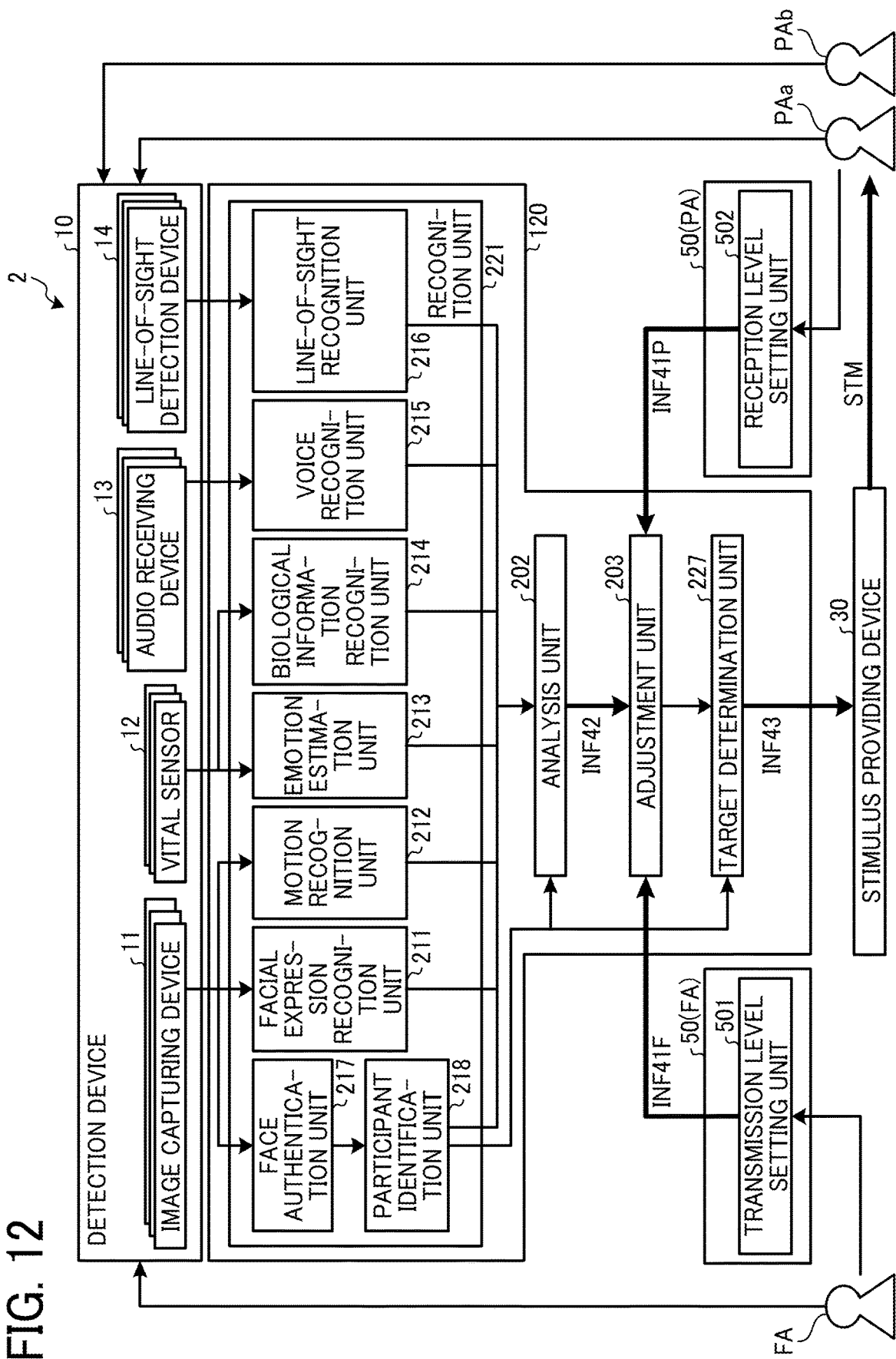
FIG. 12 is a block diagram illustrating an example of a configuration of the information processing system according to the one of the variations of the exemplary embodiment of the present disclosure.

Referring to FIGS. 11 to 12, an information processing system 2 according to a variation of the present embodiment is described in detail. The information processing system 2 according to the present variation is different from the above-described embodiment in that the rhythm is also provided to some participants PAa and PAb who communicate face-to-face among the plurality of participants FA, PAa, and PAb.

In the following, regarding drawings, the same components as those of the above-described embodiment are denoted by the same reference numerals, and the description is omitted.

FIG. 11 is a diagram illustrating the plurality of participants FA, PAa, and PAb participating in an online communication using the information processing system 2 according to a variation of the above-described embodiment.

As illustrated in FIG. 11, among the plurality of participants FA, PAa, and PAb, the participants PAa and PAb as second participants are physically close to each other in the same room, for example, and can communicate face-to-face without the online communication. The participant FA and the participants PAa and PAb communicate with each other via online in substantially the same manner as the participants FA and PA in the above-described embodiment.

The number of participants PAa and PAb communicating face-to-face is not limited to two, and may be three or more.

In addition, there may also be one or more participants in a site of the participant FA, so that the participant FA and the one or more participants can perform a face-to-face communication.

Around the participant PAa, and PAb, the image capturing device 11, vital sensors 12a and 12b, an audio receiving device 13, line-of-sight detection devices 14a and 14b, light sources 31a and 31b, audio output devices 32a and 32b, vibration devices 34a and 34b, display devices 33a, 33b, 52, and 53, and the input device 51 are disposed.

In the example of FIG. 11, among the devices, the vital sensor 12a, the line-of-sight detection device 14a, the light sources 31a, the audio output device 32a, the vibration device 34a, and the display device 33a are arranged for the participant PAa. The vital sensors 12b, the line-of-sight detection devices 14b, the light sources 31b, the audio output device 32b, the vibration device 34b, and the display device 33b are arranged for the participants PAb.

The image capturing device 11, the audio receiving device 13, the display devices 52 and 53, and the input device 51 are shared between the participants PAa and PAb. However, the image capturing device 11, the audio receiving device 13, the display device 52 and 53, and the input device 51 may also be prepared as many as the number of the participants PAa and PAb.

As in the example of FIG. 11, among the devices, at least the light sources 31a and 31b, the audio output devices 32a and 32b, the vibration devices 34a and 34b, and the display devices 33a and 33b, which are examples of the stimulus providing device 30, are preferably prepared as many as the number of the participants PAa and PAb.

In addition, around the participant FA, the image capturing device 11, the vital sensor 12, the audio receiving device 13, the line-of-sight detection device 14, the light source 31, the audio output device 32, the vibration device 34, the display devices 33, 52, and 53, and the input device 51 are disposed, in substantially the same manner as the participant FA in the above-described embodiment.

The image capturing device 11 is shared between the participants PAa and PAb, and captures an image of the participants PAa and PAb. The vital sensor 12a is attached to the participant PAa and detects the heartbeat, the respiration, the skin potential, the body temperature, and other information of the participant PAa. The vital sensor 12b is attached to the participant PAb and detects the heartbeat, the respiration, the skin potential, the body temperature, and other information of the participant PAb. The audio receiving device 13 is shared between the participants PAa and PAb, and receives the voice of the participants PAa and PAb and converts the voice into an electric signal. The line-of-sight detection device 14a detects the line of sight of the participant PAa. The line-of-sight detection device 14b detects the line of sight of the participant PAb.

The light source 31a blinks at a predetermined rhythm to provide the rhythm to the participant PAa with a level of intensity adjusted for the participant PAa. The light source 31b blinks at a predetermined rhythm to provide the rhythm to the participant PAb with a level of intensity adjusted for the participant PAb. It is preferable that the light sources 31a and 31b are covered with a cover or light sources having high directivity are used so that a rhythm directed to one of the participants PAa and PAb is not provided to the other of the participants PAa and PAb.

The audio output device 32a emits audio at a predetermined rhythm to provide the rhythm to the participant PAa at a level of intensity adjusted for the participant PAa. The audio output device 32b emits audio at a predetermined rhythm to provide the rhythm to the participant PAb at a level of intensity adjusted for the participant PAb. It is preferable that the audio output devices 32a and 32b are covered with a soundproof cover or use an audio source having high directivity so that a rhythm for one of the participants PAa and PAb is not provided to the other of the participants PAa and PAb.

The display device 33a displays animation, video effects or the like dynamically changing at a predetermined rhythm to provide the rhythm to the participant PAa at a level of intensity adjusted for the participant PAa.

The display device 33b displays animation, video effects, or the like dynamically changing at a predetermined rhythm to provide the rhythm to the participant PAb at a level of intensity adjusted for the participant PAb. It is preferable that the display devices 33a and 33b are covered with a cover or a monitor of a mobile device such as a tablet so that a rhythm for one of the participants PAa and PAb is not provided to the other of the participants PAa and PAb.

The vibration device 34a vibrates at a predetermined rhythm to transmit the vibration to a finger or the like of the participant PAa, and provides the rhythm to the participant PAa at a level of intensity adjusted for the participant PAa. The vibration device 34b vibrates at a predetermined rhythm to transmit the vibration to a finger or the like of the participant PAb, and provides the rhythm to the participant PAb at a level of intensity adjusted for the participant PAb.

Similarly to the vibration device 34 according to the above-described embodiment, the vibration devices 34a and 34b may have a form of an input device such as a keyboard operated or touched by the participants PAa and PAb, a controller, a chair, a desk, or the like. However, it is desirable that the vibration devices 34a and 34b have a form other than an article shared between the participants PAa and PAb so that a rhythm for one of the participants PAa and PAb is not provided to the other one of the participant PAa and PAb.

The input device 51 and the display devices 52 and 53 may include a part of a terminal such as a PC shared between the participants PAa and PAb. The participants PAa and PAb share a local PC, for example, and can input transmission level setting information and reception level setting information from the PC. However, the input device 51 and the display device 52 and 53 may be configured as a mobile terminal, and as described above, the input device 51 and the display device 52 and 53 may be prepared as many as the number of participants PAa and PAb.

FIG. 12 is a block diagram illustrating an example of a configuration of the information processing system 2 according to the variation of the above-described embodiment.

As illustrated in FIG. 12, the information processing system 2 according to the present variation includes the detection device 10, an information processing apparatus 120, the stimulus providing device 30, and the input/output device 50. FIG. 12 illustrates a part of the main configuration of the detection device 10, the information processing apparatus 120, the stimulus providing device 30, and the input/output device 50.

The participant FA inputs for the transmission level setting for each of the participants PAa and PAb using the input/output device 50 (FA), and the information processing apparatus 120 acquires the transmission level setting information INF41F from the input/output device 50 (FA).

The participants PAa and PAb input for the reception level settings for the participants PAa and PAb, respectively, using the input/output device 50 (PA), and the information processing apparatus 120 acquires the reception level setting information INF41P from the input/output device 50 (PA).

The detection device 10 is, for example, at least one of the image capturing device 11, the vital sensor 12, the audio receiving device 13, and the line-of-sight detection device 14. Among these, for example, the image capturing device 11 and the audio receiving device 13 are shared between the participants PAa and PAb.

The information processing apparatus 120 includes a recognition unit 221, the analysis unit 202, the adjustment unit 203, and a target determination unit 227.

The recognition unit 221 includes a face authentication unit 217 and a participant identification unit 218 in addition to the configuration of the recognition unit 201 of the above-described embodiment.

For example, from an image captured by the image capturing device 11, the face authentication unit 217 extracts, for each of the participants PAa and PAb, a change in each part of the face forming an expression such as anger, disgust, fear, pleasure, sadness, surprise, or neutrality as a feature.

The participant identification unit 218 identifies each of the participants PAa and PAb included in the same image captured by the image capturing device 11, for example, based on the feature extracted by the face authentication unit 217. At this time, the features of the participants PAa and PAb may be stored in a database in advance and incorporated in the information processing apparatus 120, and the participant identification unit 218 may identify the participants PAa and PAb with reference to the database. Alternatively, the participant identification unit 218 may learn the features of the participants PAa and PAb in advance by machine learning, for example.

In addition, the participant identification unit 218 may identify the participants PAa and PAb based on another feature recognized by another component of the recognition unit 221. As an example, based on the feature extracted by the voice recognition unit 215, the participant identification unit 218 may identify the voice of each of the participants PAa and PAb simultaneously received by the audio receiving device 13, of which the number is one, for example.

When the participant identification unit 218 is caused to identify the voices of the participants PAa and PAb, the features of the voices of the participants PAa and PAb may be stored in a database in advance and incorporated in the information processing apparatus 120, and the participant identification unit 218 may identify the voices of the participants PAa and PAb with reference to the database. Alternatively, the participant identification unit 218 may learn the features of the voice of each of the participants PAa and PAb in advance by machine learning, for example.

The participant identification unit 218 may comprehensively identify the participants PAa and PAb captured by the image capturing device 11 and the voice of the participants PAa and PAb received by the audio receiving device 13 based on the degree of timing coincidence between the utterance or motion of the participants PAa and PAb recognized by the voice recognition unit 215, or the motion recognition unit 212 and the facial expression change of the participants PAa and PAb recognized by the face authentication unit 217.

In addition to the above, if some of the detection devices 10 are shared between the participants PAa and PAb, the participant identification unit 218 may identify the detection information related to the participants PAa and PAb. The participant identification unit 218 generates identification information indicating these identification results.

As described above, the analysis unit 202 analyzes the communication state of each of the plurality of participants based on various kinds of information recognized by the recognition unit 201.

At this time, for example, in a case where some of the detection devices 10 such as the image capturing device 11 and the audio receiving device 13 are shared between the participants PAa and PAb, the analysis unit 202 refers to identification information obtained by the participant identification unit 218 identifying the detection information for each of the participants PAa and PAb. Accordingly, the analysis unit 202 can analyze the communication state of each of the participants FA, PAa, and PAb and generate the state information INF42 in which the psychological state of each of the participants FA, PAa, and PAb is estimated.

As described above, the adjustment unit 203 generates the intensity information INF41F in which the level of intensity of the rhythm is adjusted for each of the participants PAa and PAb based on the transmission level setting information INF41P, the reception level setting information INF42, and the state information INF43. The intensity information INF43 generated for each of the participants PAa and PAb is transmitted to the stimulus providing device 30 of each of the participants PAa and PAb.

The target determination unit 227 determines the transmission destination of the intensity information INF43 generated by the adjustment unit 203 based on the identification information generated by the participant identification unit 218. Accordingly, the intensity information INF43 adjusted for the participant PAa is transmitted to the stimulus providing device 30 that provides the sensory stimulus STM to the participant PAa. The intensity information INF43 adjusted for the participant PAb is transmitted to the stimulus providing device 30 that provides the sensory stimulus STM to the participant PAb.

The information processing apparatus 120 according to the present variation is also configured as, for example, a computer including a CPU, a ROM, a RAM, a communication I/F, and a storage device, in substantially the same manner as the information processing apparatus 20 according to the above-described embodiment. The recognition unit 221, the analysis unit 202, the adjustment unit 203, and the target determination unit 227 of the information processing apparatus 120 are implemented by, for example, the CPU that executes a rhythm providing program. The information processing apparatus 120 may further include an acquisition unit, a transmission unit, and a storage unit, in substantially the same manner as the information processing apparatus 20 according to the above-described embodiment.

According to the information processing apparatus 120 according to the present variation, the reception level setting information is acquired from each of the plurality of participants PAa and PAb who perform a face-to-face communication without going online, and the level of intensity of the rhythm to be provided to each of the plurality of participants PAa and PAb is adjusted.

As a result, the rhythm can be provided to each of the participants PAa and PAb at a level of intensity appropriately set according to a level of intensity desired by each of the participants PAa and PAb. Accordingly, the psychological stress of each of the participants PAa and PAb can be reduced, and a smooth communication can be achieved.

Aspects of the present disclosure are, for example, as follows.

Aspect 1

According to one aspect of the present disclosure, an information processing apparatus causes, in an online communication performed among a plurality of participants including a first participant and a second participant, a rhythm providing device to provide, to the plurality of participants, a rhythm to be shared among the plurality of participants.

The information processing apparatus includes an acquisition unit to acquire first setting information set by the first participant with respect to a level of intensity of the rhythm to be provided to the second participant and second setting information set by the second participant with respect to the level of intensity of the rhythm to be provided to the second participant.

The information processing apparatus includes an adjustment unit to adjust the level of intensity of the rhythm to be provided to the second participant based on the first setting information and the second setting information to generate intensity information related to the adjusted level of intensity of the rhythm.

Aspect 2

In the information processing apparatus according to Aspect 1, the second participant includes a plurality of second participants communicating face-to-face without going online.

In the information processing apparatus according to Aspect 1, the acquisition unit acquires the second setting information from each of the plurality of second participants, and the adjustment unit adjusts the level of intensity of the rhythm to be provided to each of the plurality of second participants.

Aspect 3

In the information processing apparatus according to Aspect 1 or Aspect 2, the adjustment unit adjusts the level of intensity of the rhythm by adjusting at least one of frequency, amplitude, and physical quantity of the rhythm.

Aspect 4

In the information processing apparatus according to any one of Aspect 1 to Aspect 3, the adjustment unit includes adjusts the level of intensity of the rhythm to be provided to the second participant based on detection information regarding the second participant detected by a detection device, in addition to the first setting information and the second setting information. The detection information is included in additional detection information detected by the detection device for the plurality of participants.

Aspect 5

The information processing apparatus according to Aspect 4 further includes an analysis unit that analyzes the detection information related to the second participant and generates state information indicating a communication state of the second participant.

In the information processing apparatus according to Aspect 4, the adjustment unit adjusts the level of intensity of the rhythm to be provided to the second participant based on the state information in addition to the first setting information and the second setting information.

Aspect 6

In the information processing apparatus according to Aspect 4 or Aspect 5, the detection information detected by the detection device includes at least one of voice information that is on voices uttered by the plurality of participants, image information obtained by imaging the plurality of participants, and biological information of the plurality of participants.

Aspect 7

An information processing system according to Aspect 7 includes the information processing apparatus according to any one of Aspect 1 to Aspect 6, and the rhythm providing device. The rhythm providing device includes a rhythm setting unit to set the level of intensity of the rhythm based on the intensity information, and a rhythm output unit to output, to the second participant, the rhythm of which the level of intensity is set.

Aspect 8

An information processing system according to Aspect 8 includes the information processing apparatus according to any one of Aspect 4 to Aspect 6, a rhythm providing device to provide the second participant with the rhythm of which the level of intensity is set based on the intensity information, and a detection device to detect the additional detection information for the plurality of participants.

Aspect 9

A support system according to Aspect 9 includes the information processing apparatus according to any one of Aspect 1 to Aspect 6, and the rhythm providing device, and support the online communication performed among the plurality of participants. The rhythm providing device includes a rhythm setting unit to set the level of intensity of the rhythm based on the intensity information, and a rhythm output unit to output, to the second participant, the rhythm of which the level of intensity is set.

Aspect 10

A support system according to Aspect 10 includes the information processing apparatus according to any one of Aspect 4 to Aspect 6, the rhythm providing device to provide the second participant with the rhythm of which the level of intensity is set based on the intensity information, and the detection device to detect the additional detection information for the plurality of participants.

The support system supports the online communication performed among the plurality of participants.

Aspect 11

A method for providing a rhythm to a plurality of participants by causing a rhythm providing device to provide, to the plurality of participants, the rhythm to be shared among the plurality of participants performing an online communication and including a first participant and a second participant includes obtaining first setting information set by a first participant with respect to an intensity of a rhythm to be provided to a second participant and second setting information set by the second participant with respect to the intensity of the rhythm to be provided to the second participant, each of the first participant and the second participant being one of a plurality of participants participating in online communication, the rhythm being to be provided via a rhythm providing device to be shared among the plurality of participants, and adjusting the intensity of the rhythm to be provided to the second participant based on the first setting information and the second setting information to generate intensity information related to the adjusted intensity of the rhythm.

Aspect 12

A program for providing a rhythm to a plurality of participants by causing a rhythm providing device to provide, to the plurality of participants, the rhythm to be shared among the plurality of participants performing an online communication and including a first participant and a second participant, when being executed, perform a method. The method includes obtaining first setting information set by a first participant with respect to an intensity of a rhythm to be provided to a second participant and second setting information set by the second participant with respect to the intensity of the rhythm to be provided to the second participant, each of the first participant and the second participant being one of a plurality of participants participating in online communication, the rhythm being to be provided via a rhythm providing device to be shared among the plurality of participants, and adjusting the intensity of the rhythm to be provided to the second participant based on the first setting information and the second setting information to generate intensity information related to the adjusted intensity of the rhythm.

According to a related art, a degree of individual participation and an individual psychological state in relation to a communication vary among participants, depending on a relationship between the participants or perspectives and attitudes of the participants, for example. According to such a related art, some participants may feel psychological stress by being forcibly urged to a state designated by a third party such as an organizer of a meeting.

According to an embodiment of the present disclosure, the quality of communication can be improved while the psychological stress of a participant is reduced.

Although the present embodiment is described heretofore, the specific configuration of each apparatus or unit, the specific content of processing, etc., are not limited to the above description. Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus for causing a rhythm providing device to provide a rhythm to be shared among a plurality of participants participating in an online communication including a first participant and a second participant, the information processing apparatus comprising circuitry configured to:
obtain first setting information and second setting information, the first setting information set by the first participant with respect to a level of intensity of the rhythm to be provided by the rhythm providing device from the first participant to the second participant, and the second setting information set by the second participant with respect to the level of intensity of the rhythm to be provided by the rhythm providing device from the first participant to the second participant, the level of intensity of the rhythm being at least one of frequency of the rhythm, amplitude of the rhythm, or physical quantity of the rhythm;
determine the level of intensity of the rhythm to be provided to the second participant based on the first setting information and the second setting information; and
generate and transmit intensity information related to the determined level of intensity of the rhythm to the rhythm providing device.

2. The information processing apparatus of claim 1, wherein
the second participant includes a plurality of second participants communicating with each other face-to-face, and
the circuitry is configured to:
obtain the second setting information from each of the plurality of second participants; and
adjust the level of intensity of the rhythm to be provided to each of the plurality of second participants.

3. The information processing apparatus of claim 1, wherein
the circuitry is configured to adjust the level of intensity of the rhythm to be provided to the second participant based on the first setting information, the second setting information, and detection information detected by a detection device and related to the second participant, and
wherein the detection device obtains additional detection information related to another participant of the plurality of participants.

4. The information processing apparatus of claim 3, wherein
the circuitry is further configured to:
analyze the detection information related to the second participant;
generate state information indicating a communication state of the second participant; and
adjust the level of intensity of the rhythm to be provided to the second participant based on the first setting information, the second setting information, and the state information.

5. The information processing apparatus of claim 3, wherein
the detection information and the additional detection information include at least one of voice information, image information, or biological information.

6. The information processing apparatus of claim 1, wherein
the first participant actively participates in the online communication, and the second participant passively participates in the online communication.

7. The information processing apparatus of claim 1, wherein
the first participant switches from actively participating to passively participating in the online communication, and the second participant switches from passively participating to actively participating in the online communication, and
the circuitry is further configured to:
obtain the second setting information set by the second participant actively participating in the online communication with respect to the level of intensity of the rhythm to be provided by the rhythm providing device from the second participant to the first participant passively participating in the online communication, and the first setting information set by the first participant passively participating in the online communication with respect to the level of intensity of the rhythm to be provided by the rhythm providing device from the second participant actively participating in the online communication to the first participant;

determine the level of intensity of the rhythm to be provided to the first participant passively participating in the online communication based on the first setting information and the second setting information; and generate and transmit intensity information related to the determined level of intensity of the rhythm to the rhythm providing device.

8. The information processing apparatus of claim 1, wherein the first participant makes a speech in the online communication.

9. The information processing apparatus of claim 1, wherein the first participant and the second participant switch positions such that the second participant makes a speech in the online communication; and the circuitry is further configured to:

obtain the second setting information set by the second participant making the speech with respect to the level of intensity of the rhythm to be provided by the rhythm providing device from the second participant to the first participant, and the first setting information set by the first participant with respect to the level of intensity of the rhythm to be provided by the rhythm providing device from the second participant making the speech to the first participant;

determine the level of intensity of the rhythm to be provided to the first participant based on the first setting information and the second setting information; and generate and transmit intensity information related to the determined level of intensity of the rhythm to the rhythm providing device.

10. A method for providing a rhythm to be shared among a plurality of participants in an online communication including a first participant and a second participant, via a rhythm providing device, the method comprising:

obtaining first setting information and second setting information, the first setting information set by the first participant with respect to a level of intensity of the rhythm to be provided by the rhythm providing device from the first participant to the second participant, and the second setting information set by the second participant with respect to the level of intensity of the rhythm to be provided by the rhythm providing device from the first participant to the second participant, the level of intensity of the rhythm being at least one of frequency of the rhythm, amplitude of the rhythm, or physical quantity of the rhythm;

determining the level of intensity of the rhythm to be provided to the second participant based on the first setting information and the second setting information; and generating and transmitting intensity information related to the determined level of intensity of the rhythm to the rhythm providing device.

11. A non-transitory recording medium storing a plurality of instructions which, when executed by one or more processors, causes the processors to perform a method for providing a rhythm to be shared among a plurality of participants in an online communication including a first participant and a second participant, via a rhythm providing device, the method comprising:

obtaining first setting information and second setting information, the first setting information set by the first participant with respect to a level of intensity of the rhythm to be provided by the rhythm providing device from the first participant to the second participant, and the second setting information set by the second participant with respect to the level of intensity of the rhythm to be provided by the rhythm providing device from the first participant to the second participant, the level of intensity of the rhythm being at least one of frequency of the rhythm, amplitude of the rhythm, or physical quantity of the rhythm;

determining the level of intensity of the rhythm to be provided to the second participant based on the first setting information and the second setting information; and generating and transmitting intensity information related to the determined level of intensity of the rhythm to the rhythm providing device.

\* \* \* \* \*